United States Patent [19]
Morris et al.

[11] Patent Number: 5,671,436
[45] Date of Patent: Sep. 23, 1997

[54] VERSATILE RF DATA CAPTURE SYSTEM

[75] Inventors: Michael D. Morris, Cedar Rapids; Lyle L. Zumbach, Coggon, both of Iowa

[73] Assignee: Norand Corporation, Cedar Rapids, Iowa

[21] Appl. No.: 520,136

[22] Filed: Aug. 28, 1995

Related U.S. Application Data

[63] Continuation-in-part of Ser. No. 267,758, Jul. 5, 1994, Pat. No. 5,568,645, which is a continuation of Ser. No. 748,150, Aug. 21, 1991, Pat. No. 5,349,678.

[51] Int. Cl.$^6$ ............................................. G06F 17/30
[52] U.S. Cl. ............................................. 395/800; 395/610
[58] Field of Search ............................. 395/200.09, 601, 395/610, 611, 613, 615, 680, 684, 800; 455/49.1, 54.1

[56] References Cited

U.S. PATENT DOCUMENTS

| | | | |
|---|---|---|---|
| 3,942,157 | 3/1976 | Azure | 345/172 |
| 4,125,871 | 11/1978 | Martin | 395/750 |
| 4,277,837 | 7/1981 | Stuckert | 395/241 |
| 4,821,291 | 4/1989 | Stevens et al. | 375/259 |
| 4,839,854 | 6/1989 | Sakami et al. | 395/800 |
| 4,905,186 | 2/1990 | Fukui | 395/239 |
| 4,910,794 | 3/1990 | Mahany | 455/67.4 |
| 4,924,462 | 5/1990 | Sojka | 370/449 |
| 4,940,974 | 7/1990 | Sojka | 340/825.08 |
| 5,054,112 | 10/1991 | Ike | 455/41 |
| 5,218,187 | 6/1993 | Koenck et al. | 235/375 |

*Primary Examiner*—Thomas M. Heckler
*Attorney, Agent, or Firm*—Cowan, Liebowitz & Latman, P.C.

[57] ABSTRACT

A system for collecting data from at least one remote site and transmitting the collected data to a main information center. The system has information distributed throughout and is divided into first, second, and third portions. The system includes at least one portable terminal for collecting data at the remote site. The terminal comprises a first memory for storing the first information portion. The terminal operates by a programmed computer to sense the need for information for its use to generate an information call identifying the needed information, and to respond to the information call for searching its first memory for the presence or absence of that needed information. If that needed information is available in the first memory of the terminal, it is supplied for use by the portable terminal. The system further comprises a first mobile server to be transported to various locations with respect to the main information center and the remote site. The first mobile server comprises a second memory for storing the second information portion, and responds to the information call for searching the second memory for presence or absence of that needed information. The system further includes a second server at the main information center which comprises a third memory for storing the third information portion, and operates to search the third memory for the presence or absence of that needed information.

28 Claims, 13 Drawing Sheets

VERSATILE RF DATA CAPTURE SYSTEM

This application is a continuation-in-part of Ser. No. 08/267,758 filed Jul. 5, 1994, now U.S. Pat. No. 5,568,645, which is a continuation of Ser. No. 07/748,150 filed Aug. 21, 1991, now U.S. Pat. No. 5,349,678.

AUTHORIZATION PURSUANT TO 37 CFR 1.71 (d) AND (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO RELATED, CO-PENDING PATENT APPLICATIONS

The following, co-pending applications are all assigned to assignee of this invention and are incorporated herein by reference:

1. U.S. Ser. No. 700704 (Express Mail Label No.: FB 537 394 682US), entitled "SYSTEM FOR COUPLING A MULTIPLICITY OF RF DATA COLLECTION TERMINALS WITH HOST COMPUTER MEANS" filed on May 14, 1991 in the names of Gollnick et al., now abandoned in favor of U.S. Ser. No. 07/857,603, filed Mar. 30, 1992, now abandoned in favor of U.S. Ser. No. 07/947,102, filed Sep. 14, 1992, now abandoned; and 2. U.S. Ser. No. 660618 (Express Mail mailing Label No.: FB 537 394 671US), entitled "SYSTEM FOR PROCESSING COMMUNICATIONS WITH MULTIPLE PORTABLE RF DATA COLLECTION TERMINALS", filed Feb. 25, 1991 in the name of P. Miller, now abandoned in favor of U.S. Ser. No. 07/830,561, filed Jan. 30, 1992, now abandoned.

BACKGROUND OF THE INVENTION

The present invention relates to a data capture system 10 illustrated in FIG. 1 for entering data at a plurality of remote locations using means such as a plurality of portable data collection terminals 12a, b - - - n. The data capture system 10 is applicable to receive and collect a wide variety of data and has found particular application in warehouses or retail store where a data capture system 10 would be used to keep an up-to-date record of the products to be marketed. Typically, the system 10 would be capable of updating on a real time basis the inventory count of products, and to use stock locator data to identify where each product of the remaining inventory is stored, when a product is moved from one place to another, and which employee has current charge of that product. In addition, when a product is sold, the price and sales person who sold the product are recorded.

Such data may be inputted into a terminal 12 by means of its keyboard 13. For example, a terminal user could count the number of one type of product and enter that number via the terminal's keyboard 13. Alternatively, data could be entered to the terminal 10 via a CCD bar code scanner 22, which is electrically coupled by a cable 20 to its terminal 12. In an illustrative embodiment of this invention, the scanner as illustratively identified in FIG. 1 by the numeral 22a and its terminal 12a could take the form of that modular scanner/terminal described in PCT international application WO90/16033 published Dec. 27, 1990. Differing types of scanners 22b and 22n could also be used with the terminals 12 and may illustratively take the form of those scanners described in U.S. Pat. Nos. 4,970,379 of Danstrom, 4,882,476 of White, 4,894,523 of Chadima, 4,877,949 of Danielson et al., 5,019,669 of Adams et al. and 4,924,462 of Sojka; International Application Ser. No. PCT/US90/03282 of Koenck et al.; and European Patent Publication No. 0 353 759 of Mahany et al.

The data capture system 10 utilizes illustratively RF transmission to bilaterally transmit data between each of the plurality of terminals 12a, b - - - n and a base radio transceiver 14. By way of example, the base radio transceiver may illustratively take the form of that model RB3000 base radio transceiver manufactured by Norand Corporation, Cedar Rapids of Iowa. In turn, the base radio transceiver 14 is connected via a communications multiplexer 16a or a communications controller 16b to a host computer 18. Illustratively, the multiplexer 16a could take the form of that model RM3200 as manufactured by Norand Corporation and the controller 16b could take the form of that controller identified as model RC2250 of Norand Corporation. The host computer 18 may illustratively be an International Business Machines Corporation PC of AT class or higher. As illustrated in FIG. 1, the host computer 18 includes a keyboard 28, a display 24 and a system unit 26.

Each of the portable data collection terminals 12a, b - - - n includes a transceiver (not shown in FIG. 1) for transmitting RF messages to and from the base radio transceiver 14. A transmitted message comprises an initialization sequence, an address indicative of the particular terminal 12a, b- or n from or to which the message is directed, a message identifier and system information, the message data and/or control commands, error control, and an end of message indication. U.S. Pat. Nos. 4,910,794; 4,924,462; and 4,940,974, each assigned to the assignee of this invention and incorporated herein by reference, provide further information on RF data collection terminals and systems.

In a RF data capture system similar to that shown in FIG. 1 known as the RT1200 system of Norand Corporation, controlled RF transmission between a plurality of terminals and a radio base is established using a communications multiplexer similar to that of the multiplexer 16a shown in FIG. 1 to provide access to a particular one of the terminals 12a, b - - - n. The RT1200 system utilizes time division multiplexing on a single frequency channel. The RT1200 communications protocol is based on a sequential polling method that transmits a query addressed to each portable terminal in succession, and allows a specified amount of time for the addressed terminal to respond when the addressed terminal has a data message ready for transmission. U.S. Pat. No. 4,940,974 describes an improved, adaptive data communications system wherein the base radio transceiver 14 transmits a multi-terminal polling signal to each of its terminals 12a, b - - - n. That multi-terminal polling signal defines a series of successive response time slots in which the terminals 12 may randomly select to respond. A terminal 12 having a message to be transmitted to the host computer 18 via the base radio transceiver 14 transmits a brief response burst in the selected time slot giving its own unique identification address. After receiving the responses from the ready terminals 12, the base radio transceiver 14 polls each of the responding terminals 12, ignoring those terminals without messages to be transmitted. This system is adaptive in that the number of time slots may be changed depending upon the number of active terminals ready to transmit data messages.

The present invention is particularly related to adapting such data capture system 10 as shown in FIG. 1 to employ distributed processing concepts. Each of the portable data collection terminals 12 has a computer processing capability in the illustrative form of a microprocessor, whereby the entire system's processing capability may be distributed between the host computer 18 and the portable terminals 12. The system 10 is structured in accordance with a client/server architecture whereby the host computer 18 acts as a server to each of the plurality of client terminals 12, whereby programs may be dynamically loaded across that RF (or any serial) data link established between the host computer 18 and its terminals 12.

The use of distributed processing is enhanced by relational database technology and the use of Structured Query Language (SQL) developed by the International Business Machines Company to provide access to relational databases. The use of relational database technology depends on organizing data in tables (or relations); each row of the table represents a record and each column represents an attribute. Various operations may be performed on these relations and, since the mathematics of these operations is very well understood, the results are predictable. An example of these operations is the "join", where two or more relations may be put together based on some common attribute. The advantage of this organization is that data may be easily retrieved in a form not envisioned by the designers; that is, ad hoc retrievals are quite easy to perform.

A further concept of distributed processing is to partition the system so that data is available to all network users but the data physically resides where it is most likely to be processed. This provides universal access without incurring severe communication overhead penalties. In the context of the data capture system 10 illustrated in FIG. 1, data is made available to each of the terminals 12 and to the host computer 18 by the use of the RF transmission between each of terminals 12 and the base radio transceiver 14. However, employing the concept of distributed processing would direct that more data and application programs be stored within each of the terminals 12, where such data is used or such programs executed. As a result, overhead penalties, primarily in terms of delays as would occur by the transmission of data between the terminals 12 and its host computer 18 are avoided.

In a client/server model, the server provides a general function to several client processes. Some of the more useful implementations of this concept are distributed databases, remote procedure calls and networked pipes. The distributed databases currently rely on some form of communication through Structured Query Language (SQL). These databases are comprised of front-end applications and a database server. The application interacts with the user. When database access is required, the application sends an SQL request to the database server which services the request across a network. This allows most of the processing to be done locally, but provides for a central data store that may be shared by many distributed users.

The remote procedure call concept allows systems to become specialized servers so that many applications may use their specialized hardware. To access these remote services, the application program makes a procedure call that is like any procedure call to the program's code. The difference is that the call results in a request to a remote system to provide the computation designated by the call.

The concept of "pipes" relates to supplying the output of one process to the input of another process. If the two processes are on different computers then this becomes a method of distributed processing. A variant of this method is the named pipe which allows select output to be input to another process over a named connection. This is the primary method of distributed inter-process communications with an OS/2 LAN Manager.

The efficient transmission of data to a remote terminal of a system is key to distributed processing. IBM's solution is their Distributed Data Management (DDM) protocols. These are a set of published IBM protocols that describe how to access files and databases on a remote system. IBM also developed a System Application Architecture (SAA) with common programming interfaces for program access to remote data on IBM SAA compliant systems. The importance of these protocols (which use LU 6.2 protocols for inter-system communication) is that a remote system such as a PC may access IBM host databases and files without having to program the host computer.

Remote data access in the non-IBM world is also becoming standard. The Network File System (NFS™)protocols (developed by Sun Microsystems but placed in the public domain) may be used to access or create files on any system running an NFS server. Novell Corporation is also providing similar services to a wide range of systems with its portable Netware™.

In current data capture systems employing a plurality of remote terminals 12, the application program is run in the centrally disposed host computer 18 for real time control of the remote terminals 12. Placing control in the host computer 18 increases significantly the hardware and software complexity forcing the host computer 18 to run multiple processes. Such application programs residing in the host computer 18 are complicated by the need to assure the concurrent control over shared data. Further, the host computer 18 must be fast enough to service all remote terminals 12 in real time. In such current data capture systems, the host computer 18 must normally validate data entry by the user and must respond to all user input, thus requiring significant amounts of data to be sent back and forth over an RF link between each of the terminals 10 and its host computer 18 as well as increasing the number of data transition session between the host computer 18 and its terminals 12.

The present invention is related to the use of distributed processing concepts in a RF data capture system 10 as generally shown in FIG. 1 and, in particular, to improve the efficiency of such overall systems by improving the speed and efficiency of data transmission over the RF link between each of the terminals 12a, b - - - n and the base radio transceiver 14.

SUMMARY OF THE INVENTION

It is therefore an object of this invention to enlarge and extend the range of a system for data collection.

It is a still further object of this invention to provide a new and improved mobile server which may be selectively moved from location to location, whereby data may be gathered from data collecting terminals at each of the locations.

It is a still further object of this invention to provide a new and improved system of distributive processing information stored at a main information center, at one or more remote sites and at an intermediate, mobile server.

It is another object of this invention to provide to employ a flexible wireless communication link or links which permit efficient transmission of data from a remote site to a main information center.

It is a still further object of this invention to provide a flexible wireless communication system which permits efficient radio transmission of data over different ranges to from one or more remote sites to a main information center.

It is another object of this invention to provide a new and improved distributed processing system employing a mobile client/server unit which acts as a server to a computerized data terminal disposed terminal disposed at a remote site and as a client to a server at the main information center.

In accordance with these and other objects of this invention, a system is described for collecting data from at least one remote site and transmitting the collected data to a main information center. The data collecting system has information distributed throughout and is divided into first, second, and third portions. The system includes at least one portable terminal for collecting data at the remote site. The terminal comprises a device for collecting data and a first memory for storing the first information portion. The terminal operates illustratively by a programmed computer to sense the need for information for its use to generate an information call identifying the needed information, and to respond to the information call for searching its first memory for the presence or absence of that needed information. If that needed information is available in the first memory of the terminal, it is supplied for use by the portable terminal.

The data collecting system further comprises a first mobile server to be transported to various locations with respect to the main information center and the remote cite. The first mobile server comprises a second memory for storing the second information portion, and responds to the information call for searching the second memory for presence or absence of that needed information. The data collection system further includes a second server at the main formation center. The second server comprises a third memory for storing the third information portion, and operates as by a programmed computer to search the third memory for the presence or absence of that needed information. A first communication path interconnects the first mobile server and the data collection terminal for transmitting the collected data from the data collection terminal to the first mobile server. The programmed computer of the data collection terminal is responsive to the absence of that needed information within the first memory for transmitting from the calling terminal the information call via the first communication link to the first mobile server. The programmed computer of the first mobile server responds to the receipt of the transmitted information call to search the second memory for the presence therein of the needed information and, if present, for accessing the needed information from the second memory and for transmitting it via the first communication link for use by the calling terminal.

The data collection system further includes a second communication link which interconnects the first mobile server and the second server for transmitting the collected data from the first mobile server to the second server. The programmed computer of the first mobile server responds to the receipt of the transmitted information call from the calling terminal for searching the second memory for that needed information, and if absent, for retransmitting the information call via the second communication link from the first mobile server to the second server. The programmed computer of the second server responds to the receipt of the retransmitted information call from the first mobile server to search the third memory for that needed information and, if present, for accessing and transmitting that needed information via the first and second communication links for use by the calling terminal.

In a further aspect of this invention, the data collecting terminal comprises a first radio having a first transmission range. The first mobile server has a second radio of the first transmission range and a third radio of a second transmission range. The second server has a fourth radio of the second transmission range. The second transmission range is longer than the first range. The second server has a fifth radio of the first transmission range. The second communication link operates alternatively in a first short range mode wherein the second communication means comprises the first radio and the fifth radio when the first mobile server is transported to a location within the first transmission range from the main information center or in second long range mode wherein the second communication link comprises the third and fourth radios when the first mobile server is transported to a location beyond the first range.

In a further aspect of this invention, the first mobile server comprises at least first and second ports. The first communication link is coupled to both of the first and second ports. The programmed computer of the first mobile server periodically transmits through each of the first and second ports a message that the first mobile server is available to receive and to respond to the transmitted information call. The first communication link connects the data collecting terminal to one of the first and second ports. The data collecting terminal responds to the available message for transmitting via the connected one port a response message. The first mobile server senses which connected one port received the most recent response message from the data collecting terminal and transmits back to the data collecting terminal that needed information over the sensed one connected port, regardless of whether the data collecting terminal has been recently been reconnected to a different one of the first and second ports.

DESCRIPTION OF THE PREFERRED EMBODIMENT

Figure 1:
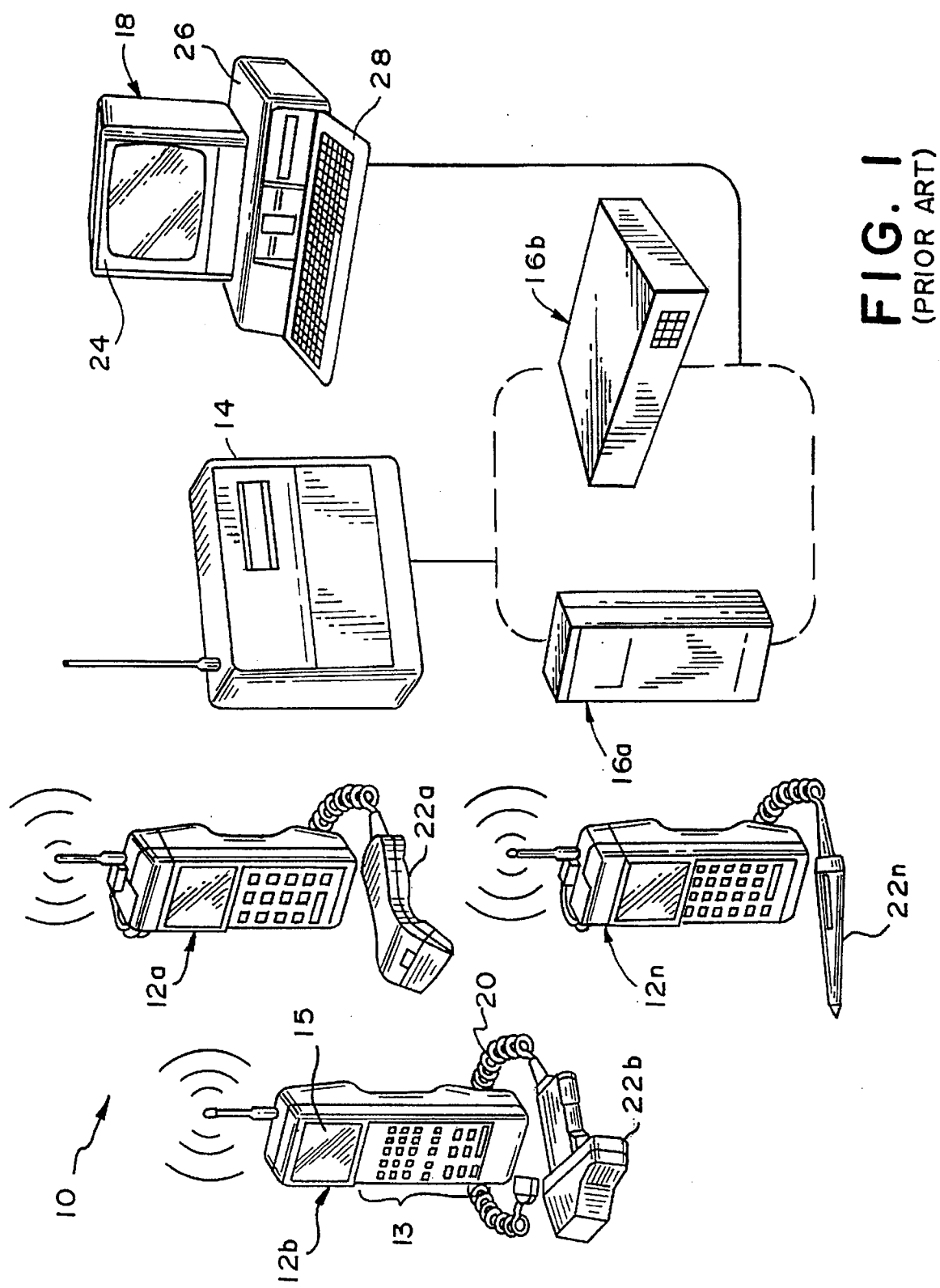
FIG. 1 is diagrammatic illustration of an existing prior art data capture system which may be upgraded to incorporate features of the present invention.
Figure 2:
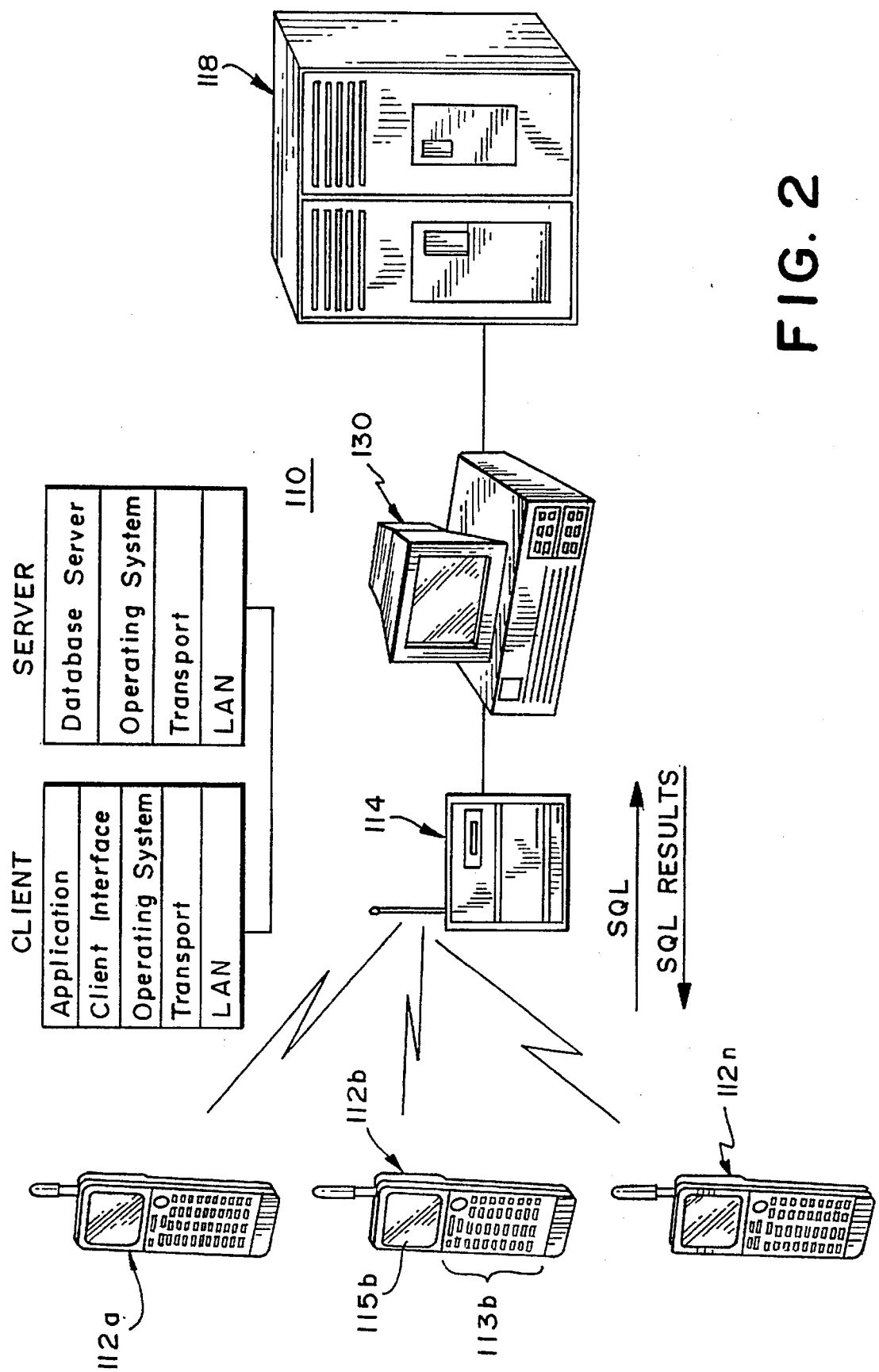
FIG. 2 is diagrammatic illustration of a data capture system configured in a client/server architecture to effect distributed processing in accordance with the teachings of this invention.
Figure 3:
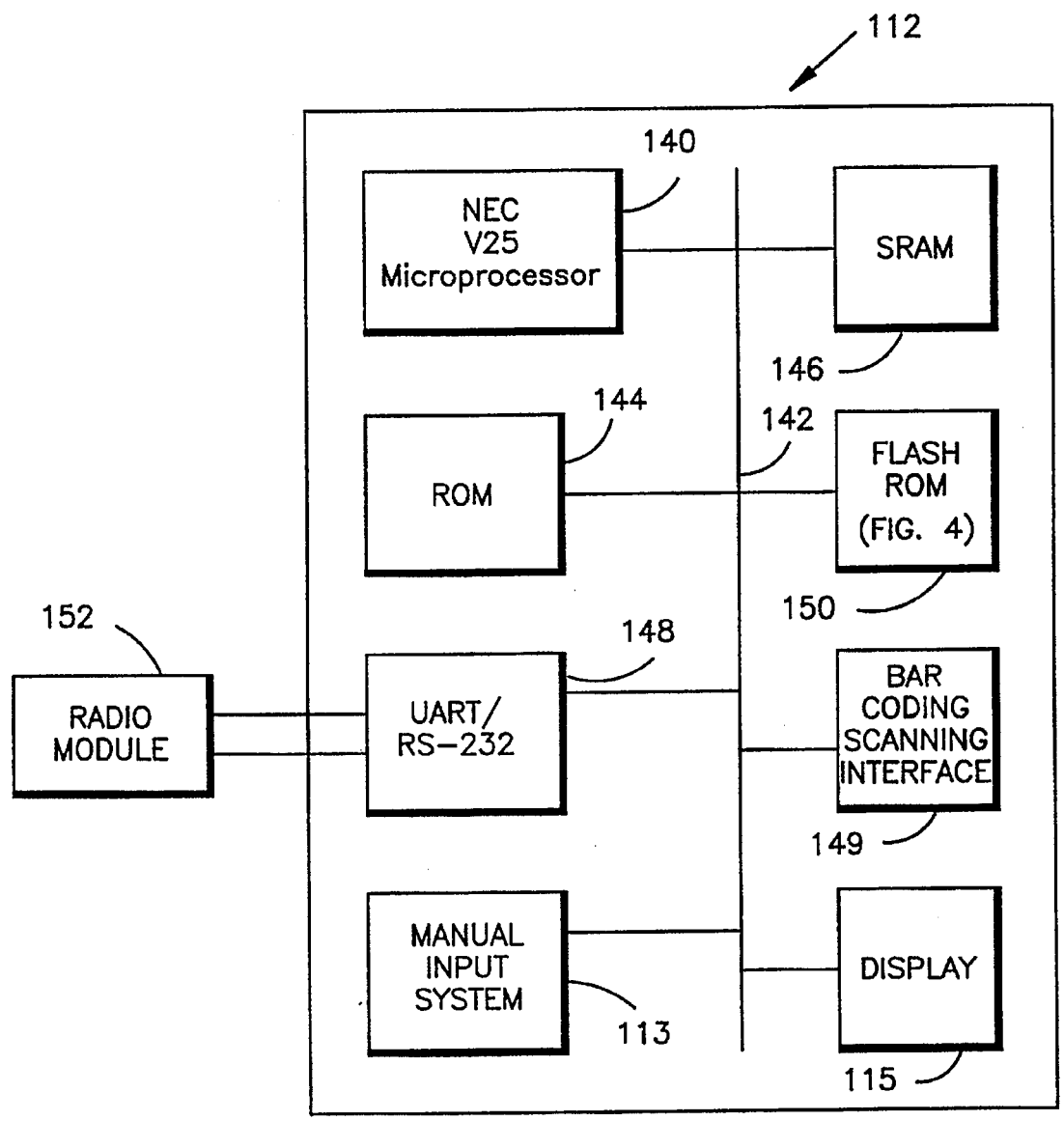
FIG. 3 is a functional block diagram illustrating the architecture of a portable data collection terminal as shown in FIG. 2.

Referring now to the drawings and, in particular to FIG. 2, there is shown a data capture system 110 in accordance with the teachings of this invention, where elements similar to those of FIG. 1 are identified by like numerals but in the 100's series. The data capture system 110 includes a plurality of portable data collection terminals 112a, b - - - n, which in an illustrative embodiment of this invention may take the form of that terminal RT1100 as manufactured by Norand Corporation. Each terminal 112 includes, as shown in FIG.3, a radio module 152 which is capable of receiving and transmitting RF signals to a base radio transceiver 114, which may illustratively take the form of that model RB3000 base radio transceiver as manufactured by Norand Corporation. The RB3000 base radio transceiver 114 is capable of operating at multiple baud rates as described in U.S. Pat. No. 4,910,794. In turn, the received signals are transmitted to a database server 130, which in response to the received signals applies signals to the base radio transceiver 114 to be transmitted to a selected one of the plurality of the terminals 112. Each message transmitted between one of the terminals 112 and the transceiver 114 includes an identification number or ID indicating the originating terminal 112 or its user. In turn, the database server 130 is coupled to a host computer 118. In an illustrative embodiment of this invention, the host computer 118 may take the form of an IBM 3090 main frame with a DB2 database engine. As will be explained in detail below, each terminal 112 is programmed to compose an SQL request that will cause the database server 130 to return an application program, a memory overlay or application specific data to the requesting terminal 112. The host computer 118 may also access the database server 130 by generating and transmitting SQL request messages thereto.

Figure 7:
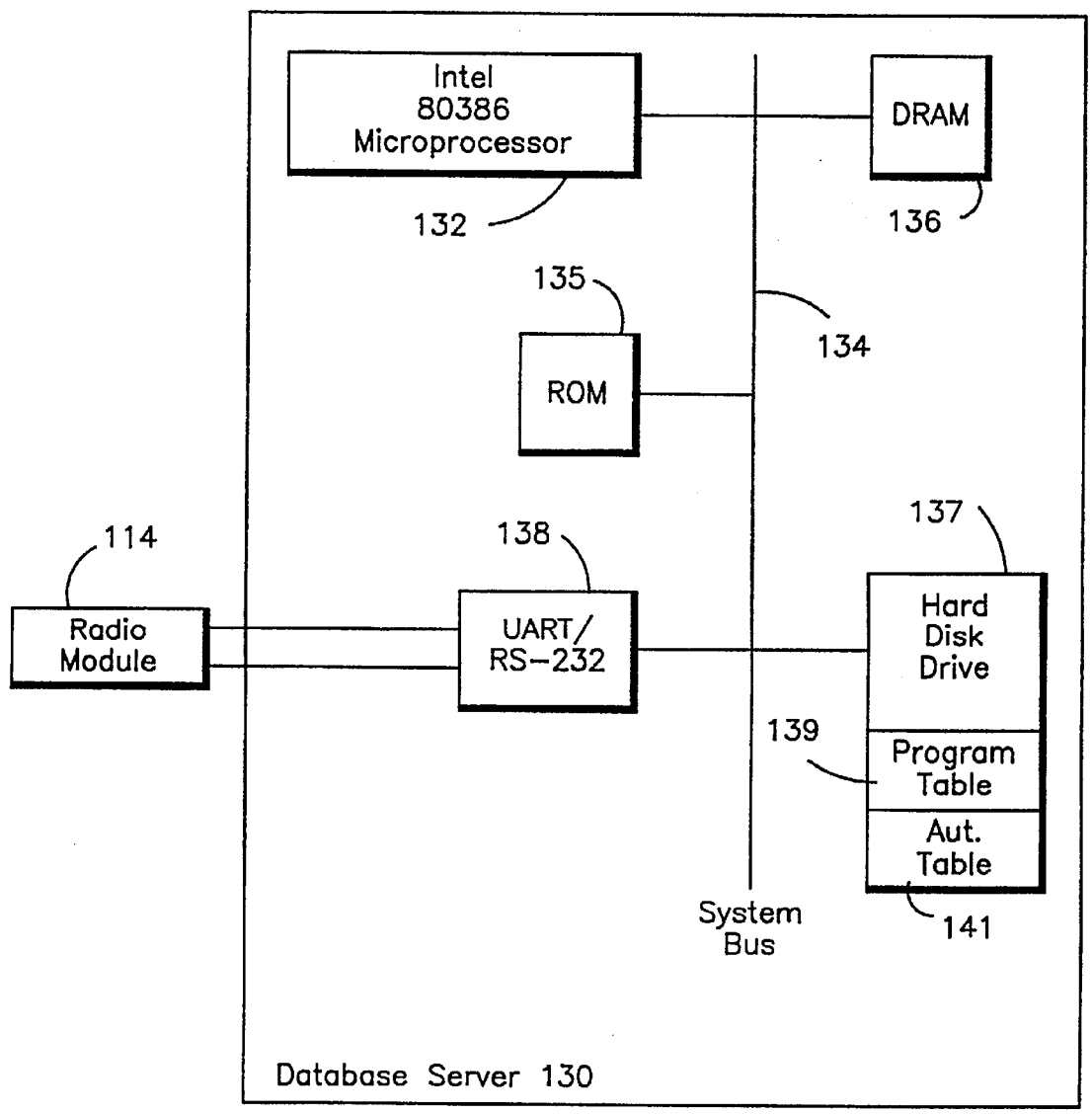
FIG. 7 is a functional block diagram of the database server shown in FIG. 2.

The host computer 118 has a database, which is accessible through the database server 130 to respond to the SQL request from one of the terminals 112, supplying to the requesting terminal 112 a computer program, memory overlays or application specific data. The host computer 118 may illustratively take the form of an IBM 3090 main frame with a DB2 database engine and would have a memory of a capacity many orders greater than that of the terminals 112. Much of the data and software to be used by the terminals 112 need not be stored with in the terminal's memory, but rather may reside in the database of the server 130 or in the memory of the host computer 118. Thus, when that data and/or program stored in the database server 130 is needed, the needing terminal 112 formulates its SQL request message, transmits that message via the base radio transceiver 14 to be processed by the database server 130, which accesses its database (or the memory of the host computer 118) and retransmits the requested data or programs back to the requesting terminal 112. At least two tables are defined as shown in FIG. 7 in a memory of the database server 130 including a first program table 139 and a second authorization table 141. The program table 139 keeps track of all of the programs, the overlays and the locations where they are stored in the database of the server 130. The programs are typically stored as a "bulk" or "binary" data type. The program table requires at a minimum the following fields or attributes:

| attribute | type | description |
| --- | --- | --- |
| program name | char | Name of the program |
| overlay | char | root or other named overlay |
| date | char or date | Date program was created (revision control) |
| program | varbinary or varchar | The actual program or overlay |
| size | integer | The size of the binary to be loaded |

As will be explained later with respect to FIG. 7, the first, program table 139 and the second authorization table 141 may be established within a hard disk drive 137 of the database server 130. The SQL request includes an attribute to identify whether a new program or an overlay is to be accessed and sent by the requesting terminal 112, and the address or name of the first program table 139. The SQL request does not need to have the address of the requested program or overlay, but accesses the program table 139, which provides an address within the hard disk drive 137 in accordance with the attribute. As will be explained, the database server 130 in response to the SQL request accesses a particular program or overlay and transmits it back to the requesting terminal 112.

The second authorization table 141 identifies the relationship between a particular user and each of the programs which that user is authorized to access. For example, each user has an ID and the authorization table 141 would list the program names which may be accessed by that particular user ID. Similarly, the SQL includes the ID and an address for the authorization table 141. Thus, the SQL request accesses the authorization table 141 to see if the requesting terminal 112 or its user as identified by the ID is permitted to use a particular program or overlay. If there is a match between the ID and one of the listed programs stored in the authorization table 141, then as will be explained, the database server 130 will access that program or overlay and transmit it back to the requesting terminal 112. On the other hand, if the ID is not found within the authorization table 141, the requested program or overlay is not transmitted back to the requesting terminal 112.

FIG. 3 shows an illustrative embodiment of the hardware architecture of the elements of the portable data collection terminals 112. Each terminal 112 includes a data bus 142 for interconnecting the element of the terminal 112, which may include a ROM 144 for the bootstrap loader, a flash ROM 150 for storing system and application programs, a static RAM (SRAM) 146 for storing data, programs and dynamically loadable program overlays, a microprocessor 140 which may take the form of that processor made by NEC as a model V25, the radio module 152, a serial communication interface (UART) 148 for the radio module 152, a bar coding scanning interface 149, a manual input system such as a keyboard 113 and a display 115. The serial communication interface 148 permit messages to be transmitted and received via the radio module 152. The keyboard 113 and the-bar code scanning interface 149 permit data entry respectively by the terminal user and a CCD bar code scanner similar to those identified in FIG. 1 by the numeral 22. As is well known in the art, a scanner 22 would be moved across coded data to provide data descriptive of the item to which the bar code was attached, typically including a description of the item, its price and/or other inventory data.

Appreciating that each terminal 112 is battery operated, a plurality of memories 144, 146 and 150 are provided therein to store various types and sizes of data and programs dependent upon their use and to the end, that battery drain be minimized. The ROM 144 stores the operating system and basic input/output system (BIOS) for the microprocessor 140. The SRAM 146 stores the dynamically loadable program overlays and data. The flash ROM 150 stores the system operating program and the application programs to be executed by the microprocessor 140, typically carrying out the various inventory functions for which a terminal 112 may be programmed. A portion of the SRAM 146 is partitioned into tables for application specific data, i.e., data to be used by the stored application programs. It is a significant aspect of this invention, that not all of the application programs or application specific data which may be used by a terminal 112, should be stored in the SRAM 146, but rather that significant portions of the application programs and specific data may be stored in the database server 130 (or even in the host computer 118) to be accessed when needed by a particular terminal 112.

Figure 4:
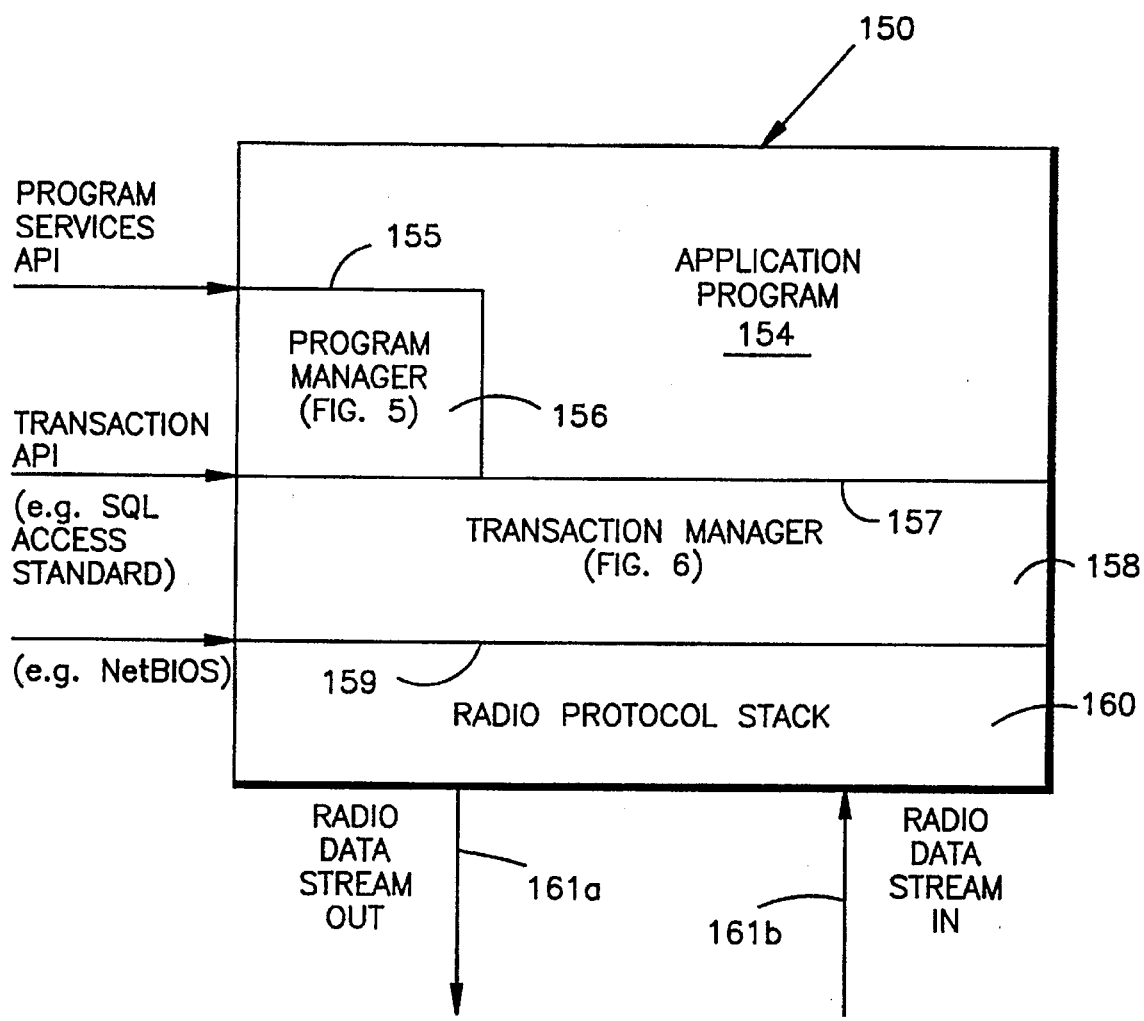
FIG. 4 is diagram of the application program architecture as stored within the ROM of the portable data collection terminal shown in FIG. 3.

The architecture of the software stored in the flash ROM 150 is shown in FIG. 4. The flash ROM 150 stores a plurality of application programs 154, e.g., inventory tracking, a program manager program 156 explained below with respect to FIG. S for transmitting the SQL request to the database server 130 to obtain an overlay module or a new program, a transaction manager 158 as explained below in detail with respect to FIG. 6 for opening a new session to receive or to transmit streams of data thereto, and a radio protocol stack 160 for effecting the RF transmission of a data stream 161a out to the database server 130 and for receiving an RF transmission via a data stream input 161b from the database server 130. An application interface 155 is established between the application programs 154 and the program manager 156, whereby any of the application programs can request the services of the program manager 156, which may be illustratively thought of as a collection of sub-routine calls for new overlay modules or a new program as will be explained below with respect to FIG. 5. Further, the application programs 154 have a transaction application programming interface (API) 157 with the transaction manager 158 as will be explained below with respect to FIG. 6. The transaction API 157 permits an application to transmit a SQL request to the database server 130. In turn, the transaction manager 158 has an interface 159 as exemplified by a NetBIOS with the radio protocol stack 160, which effects by RF transmission the sending and receiving of data to and from the database server 130. As indicated by the architecture of the data stored within the flash ROM 150 shown in FIG. 4, the radio protocol stack 160 is transparent with respect to an application program, i.e., the application program need not be programmed to effect radio transmission but only to place a call to transmit or to receive data. Either the program manager 156 or the transaction manager 158 carries out that step without any special program of the application programs 154.

The database server 130, as shown generally in FIG. 2, may illustratively take the form of an IBM PS/2 model 80 computer running IBM's OS/2 Extended Edition operating system. Generally, the database server 130 responds to a SQL request transmitted by a radio module 152 of a data collection terminal 112 (see FIG. 3), or from the host computer 118. The response of the database server 130 to the SQL request is determined by the semantics of that SQL request, which is formatted in the ANSI standard SQL. The database server 130 need not store state information about each of the terminals 112a, b - - - n. Data relating to a particular or specific terminal 112 is assigned to its own memory table, which may be illustratively formed at its unique address within a DRAM 136 of the database server 130 as shown in FIG. 7. That table for terminal specific data may be used as a buffer, where the addressed location within the DRAM 1436 acts as a buffer memory to be addressed by a SQL request and in response thereto, to transmit the data stored in that buffer to the requesting terminal 112. Alternatively, the terminal specific data could be stored in the hard disk drive 137 of the database server 130 and could be accessed by assigning an identifier attribute for that data to each terminal 112, whereby the appropriate relation in the hard disk drive 137 of the database server 130 could be defined. As will be explained, each SQL request identifies a new program, an overlay or application specific data which is required by the requesting terminal 112; the database server 130 responds to that request and transmits in turn the requested program, memory overlay or application specific data to the particular requesting terminal 112.

FIG. 7 shows the hardware architecture of the database server 130, including a data bus 134 for connecting the various elements thereof, a microprocessor 132 illustratively taking the form of that processor manufactured by Intel under its model No. 80386, a ROM 135 for the computer power up program, the diagnostic programs and the BIOS program, the dynamic RAM (DRAM) 136 serving as a memory for a database server program, server data, and a "cache" memory for the database, and a mass storage in the illustrative form of the hard disk drive 137 for storing all of the partitioned application programs and application specific data to be called by the plurality of terminals 112a, b - - - n. The database server 130 may provide gateway functions to other databases, e.g., DB2. In an operational sense, a gateway function permits access to a remote database by passing and/or reformatting the request. In other words, the SQL request could be translated into a format that would correspond and be recognized by that format of the remote database.

Referring now to FIG. 3, the SRAM 146 of a portable data collection terminal 112 is significantly smaller than the disk drive 137 of a database server 130 and may have a capacity insufficient to store all of an application program and data to be executed by its microprocessor 140. Distributed processing is accomplished in the context of this data capture system 110 employing a plurality of terminals 112 and a database server 130, by partitioning each application program into a plurality of parts or modules. The first program part is known as a root module and will be loaded first when a request for a new program is issued by the microprocessor 140 at power up or entered by a user through the terminal's key board 113. There will be at least one and typically many further parts known as memory overlays or overlay modules. The root module and the overlay modules will be given unique identifiers so that they may be loaded when requested. When the microprocessor 140 is executing the last instruction of a root module or an overlay module, then it is necessary to request and retrieve the next overlay module to permit the application program to continue to be executed without interruption. As will be explained below, this data capture system 110 is capable of formatting a SQL request for that original program or root module and for the subsequent overlay modules. In the simplest embodiment of this invention, the programmer builds into the application program a request to the program manager program 156 (see FIG. 4) to request and load an overlay module and jump to it. In a more sophisticated version, a program in the development environment determines the external function calls in program and substitutes a call to the program manager program 156. The development in partitioning of an application program is accomplished on the database server 130 using a data collection terminal emulator system that emulates the keyboard 113, the display 115 and other possible peripherals of the terminal 112. The only programming to be done specific to the database server 130 is to create the database tables and load them with any application specific data.

Figure 8:
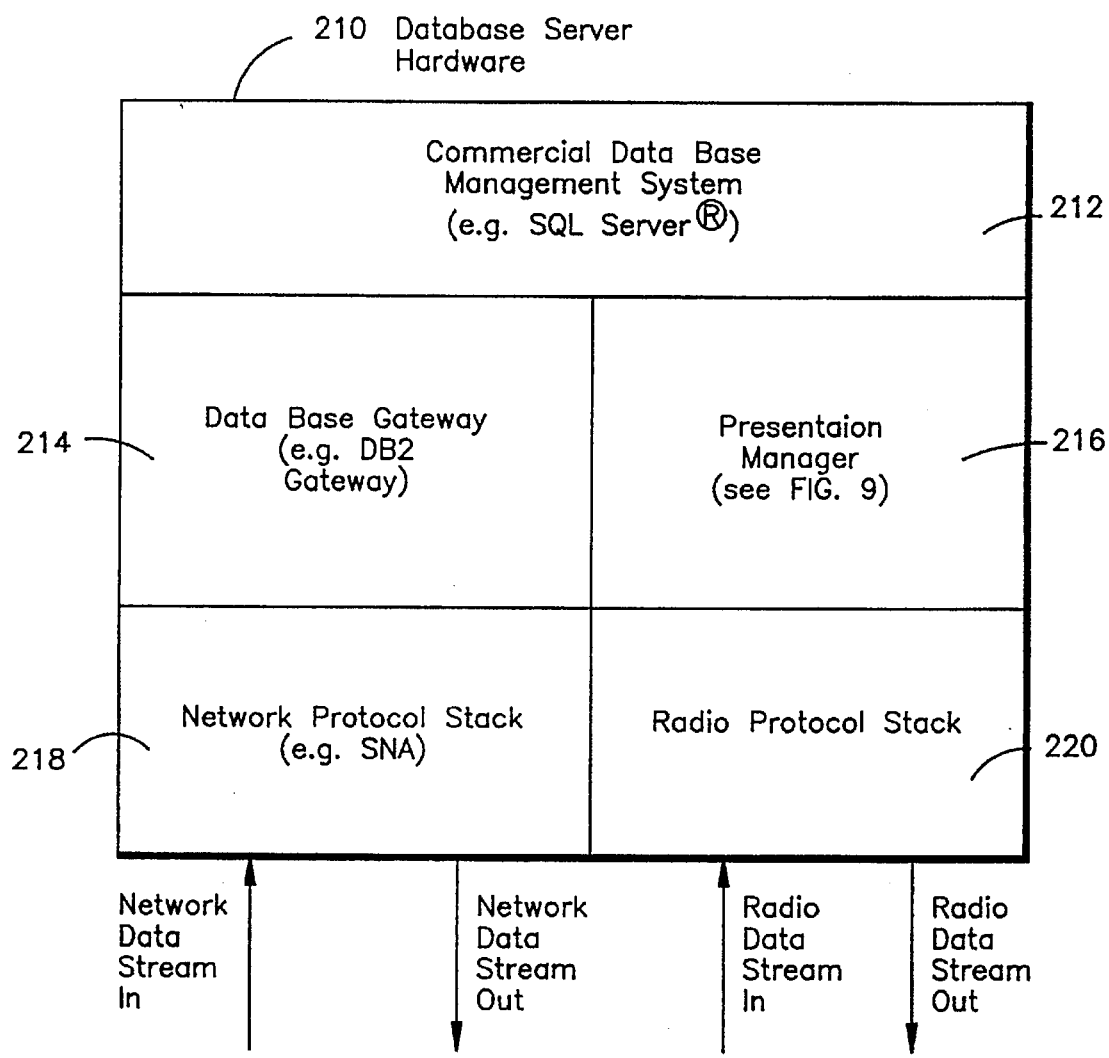
FIG. 8 is a diagrammatic showing of the architecture of the database server memory.
Figure 9:
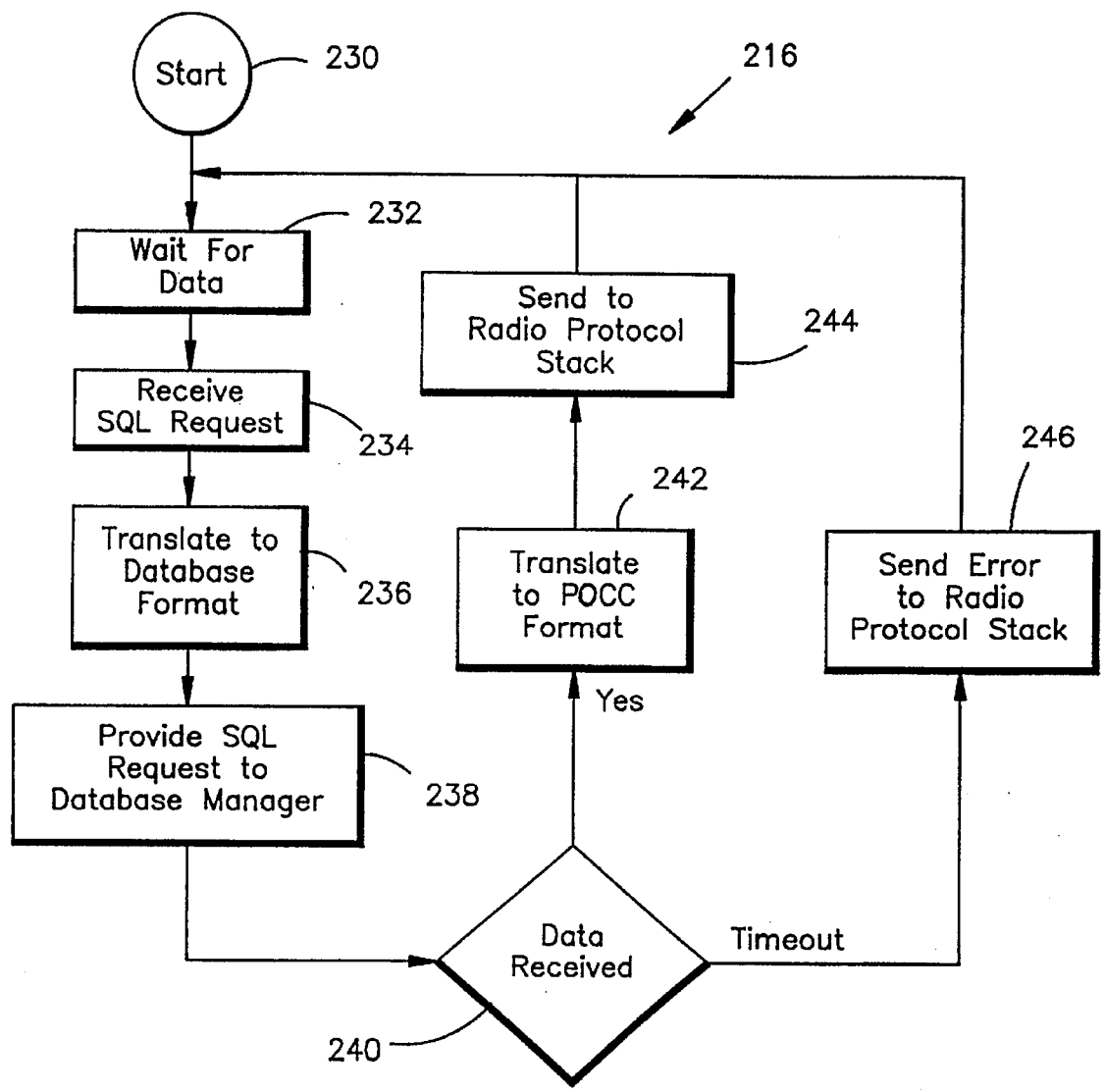
FIG. 9 is a flow diagram of the Presentation Manager program shown in the architecture diagram of FIG. 8.

The software architecture of the DRAM 136 as shown in FIG. 7 is further described in FIG. 8, as being partitioned to store a commercial database management system 212 such as the SQL Server (Microsoft), a database gateway 214, e.g., a DB2 Gateway by IBM, a presentation manager 216 to be more fully disclosed in the flow diagram of FIG. 9, a network protocol stack 218, and a radio protocol stack 220.

Figure 5:
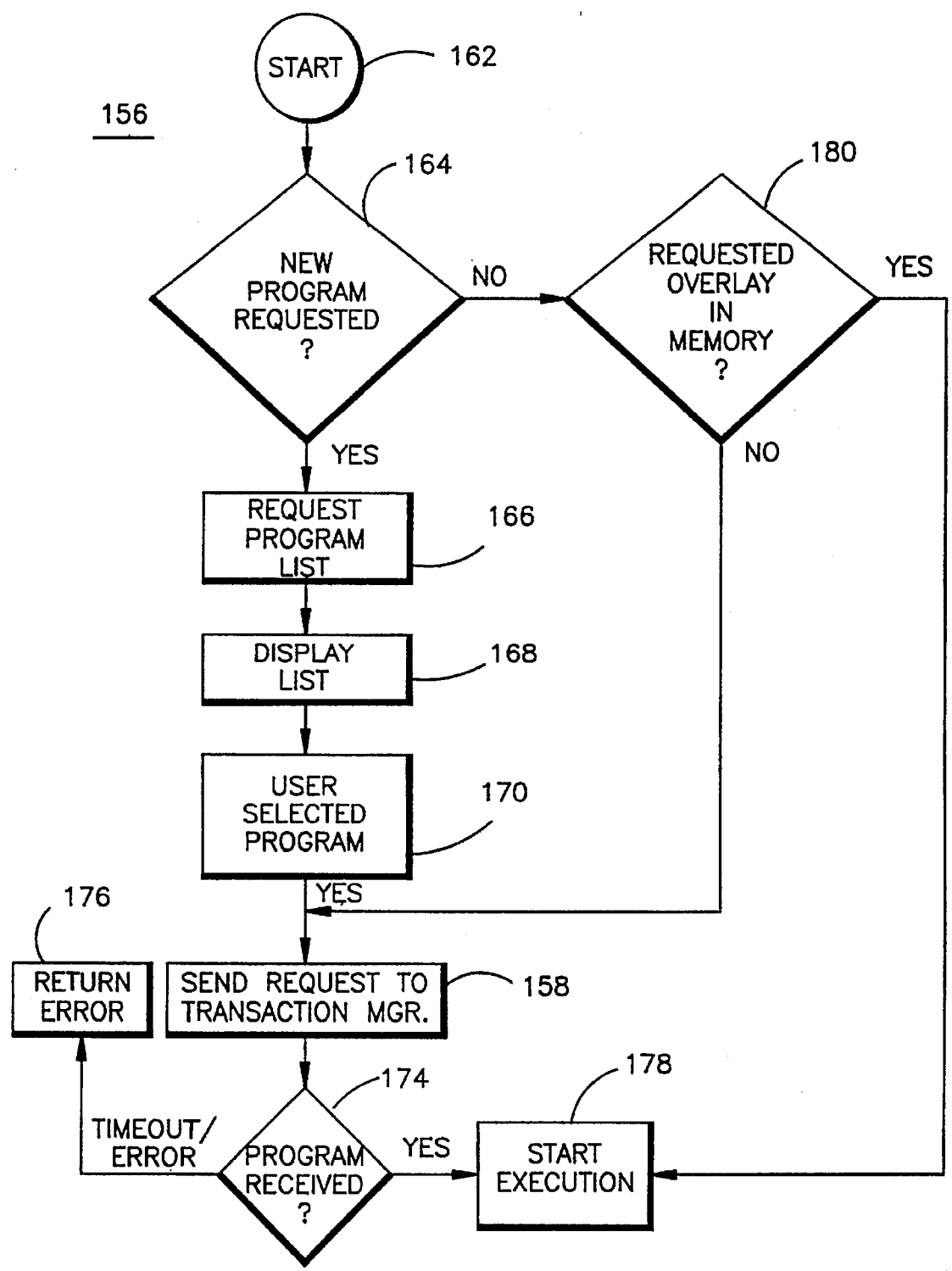
FIG. 5 is a flow diagram of the Program Manager program shown in the architecture diagram of FIG. 4.

The program manager program 156 generally shown in the software architecture diagram of FIG. 4 is more fully shown in the flow diagram of FIG.5. Basically, the program manager program 156 is disposed in the next lower layer below an application program, e.g., an inventory program, and responds to its request for either a new program or a memory overlay, to configure and transmit an SQL request to the database server 130. Upon receipt of the requested program or memory overlay, the program manager program 156 stores it in SRAM 146 before initiating its execution by the microprocessor 140. A start 162 is initiated in a number of ways by the associated application program. At power up when typically there is no application being executed, the operating system program, which is stored in the ROM 144, places a call to the program manager 156. Alternatively, a new application program may be called by the operator by actuating a selected key(s) of the keyboard 113. Appreciating that all of a particular application program need not be stored in the SRAM 146, overlay modules of the application program presently being executed may be stored in the database of the server 130 and may be called by the program manager program 156. The application program continues to be executed until it recognizes that the next step is not available, at which time it places a call through the start step 162 for the next section or overlay module of the application program to be retrieved and placed in the SRAM 146 of the requesting terminal 112.

After a start has been provided in any of these ways, step 164 determines whether a new program or memory overlay is being requested. If a new program is requested, step 166 accesses the database in the server 130 for the requested program. In particular, step 166 initiates the radio protocol stack program 160, whereby the radio module 152 (see FIG. 3) is activated to transmit the SQL request to the database server 130 via the transceiver 114 (see FIG. 2). The SQL request initiated by step 166 seeks as will be described below a list of programs which are stored in the database server 130 and is available to this originating terminal 112. Initially, step 166 calls the radio protocol stack program 160 (see FIG. 4), whereby access is made through the UART 148 (see FIG. 3) to the radio module 152 turning module 152 "on" to transmit the SQL request to the transceiver 114. In addition to actuating the radio module 152, the radio protocol stack 160 provides the protocols and media access to allow the SQL request to be sent via the transceiver 114 to the database server 130. Illustratively, the radio protocol stack 160 would include the RTC system as described in U.S. Pat. No. 4,940,974. When the radio protocol stack 160 is called to initiate transmission, a session is said to be held between the requesting terminal 112 and the database server 130. For example, when a SQL request is generated by the transaction manager 158 (see FIG. 4), a session is opened. Each session enjoys a logical relationship between the requesting terminal 112 and the database, e.g., the hard disk drive 137, within the database server 130. Each session includes one or more data packets, the data packet being the maximum byte size of the data stream appearing on the output 161a that may be transmitted by the radio module 152. The radio protocol stack 160 functions to segregate a data stream out 161a to be transmitted to the database server 130, into a number of data packets and, in similar fashion, to reassemble the data packets of an incoming data stream appearing at the input 161b into a continuous data stream. Each SQL request includes an address or ID of its originating terminal 112. As will be explained later, the database server 130 uses a presentation manager program 216 to store the relationship mapping) between the terminal ID and the operating system session identifier, which is stored in a known location within the DRAM 136 of the database server 130. In this way, the database server 130 remembers to which of the plurality of terminals 112a, b - - - n that the requested data or memory overlay, should be transmitted.

The database server 130 operating as will be explained, will respond to the SQL request for a program overlay by accessing a list of programs authorized for the particular requesting terminal 112 or user and transmitting that list back via the transceiver 114 to the requesting terminal 112. illustratively, step 166 may format an SQL request in the following manner:

select distinct program_name from authorization where user_id="morrismd"

Here the SQL request is seeking a list of distinct programs, not duplicates, which have been authorized for transmission to a particular user, i.e., a particular terminal 112. In the illustrative request, the user ID is "morrismd"; in other words, all program names having an ID attribute "morrismd" are distributed to the requesting terminal 112. Next, step 168 displays the received list of authorized programs on the terminal's display 115.

In step 170 of FIG. 5, the terminal user selects from that list of available programs as displayed in step 168 and enters via the terminal keyboard 113 the selected program to be requested from the database of the server 130. When a program is selected from the menu displayed upon the display 115 (see FIG. 2) by user actuation of the keyboard 113, the transaction manager 158 (see FIG. 6) is called to format the SQL request to retrieve from the remote database the particular program selected in step 170. An illustrative example of such an SQL request may take the form of:

select program from program_table where program_name="inventory.exe" and overlay="root"

Illustratively, the SQL request accesses the first, program table 139 (see FIG. 7) to obtain the address in the hard disk drive 137 of the requested program, e.g. the "inventory.exe" program, which is an original program or it's root overlay.

After transmission of the SQL request for a new program, step 174 waits for a returned message to the terminal 112 and will time out after a set period, e.g., 30 seconds. If no response is received by the requesting terminal 112 within this period, step 176 generates a return error message and returns it to the calling application program. On the other hand if the requested original program is received within the period, step 178 updates a mapping memory or table, which may be illustratively included within the SRAM 146 (see FIG. 3) of the terminal 112. A record of the application program or module thereof presently being executed by the microprocessor 140 is recorded in the mapping memory in terms of its starting address and length. When a new program is received and loaded into SRAM 146, step 178 records its starting address and length in the mapping memory, before loading the root module of the new program into a designated location of the SRAM 146 and, thereafter, initiates execution of the received and loaded program instead of returning control to the application program. The SRAM 146 is used as a "cache" memory to receive the 140 programs and memory overlays to be executed by the microprocessor 140. Thus, the SRAM 146 provides a local memory from which the application program may be executed, whereas the remaining sections or memory overlays of the application program and other original programs may be stored distantly in the database of the server 130.

It is appreciated that application programs are sometimes larger than it's sections or memory overlays. Therefore to efficiently use the local memory, e.g., the SRAM 146, new programs are illustratively stored in the database of the server 130, whereas program overlays may be stored in both the database of the server 130 and in the local memory, i.e., the SRAM 146. Therefore, if step 164 determines that the application is not requesting a new program, but rather an overlay module, step 180 examines the SRAM 146 and if the requested overlay module is in SRAM 146, the program moves to step 178 to initiate execution of the overlay module and control is passed to the overlay module. However, if the requested overlay module is not in the SRAM 146, step 180 moves control moves to the transaction manager 158, which formulates and transmits a SQL request via the transceiver 114 to retrieve the needed overlay module from the database of the server 130. The requested memory overlay is transmitted back via the transceiver 114 and is loaded into SRAM 146 and, thereafter, the local mapping memory in SRAM 146 is updated in terms of its starting address and length. After step 174 determines that the requested program has been timely received as explained above, step 178 initiates execution of the overlay module before returning control to the application program.

Figure 6:
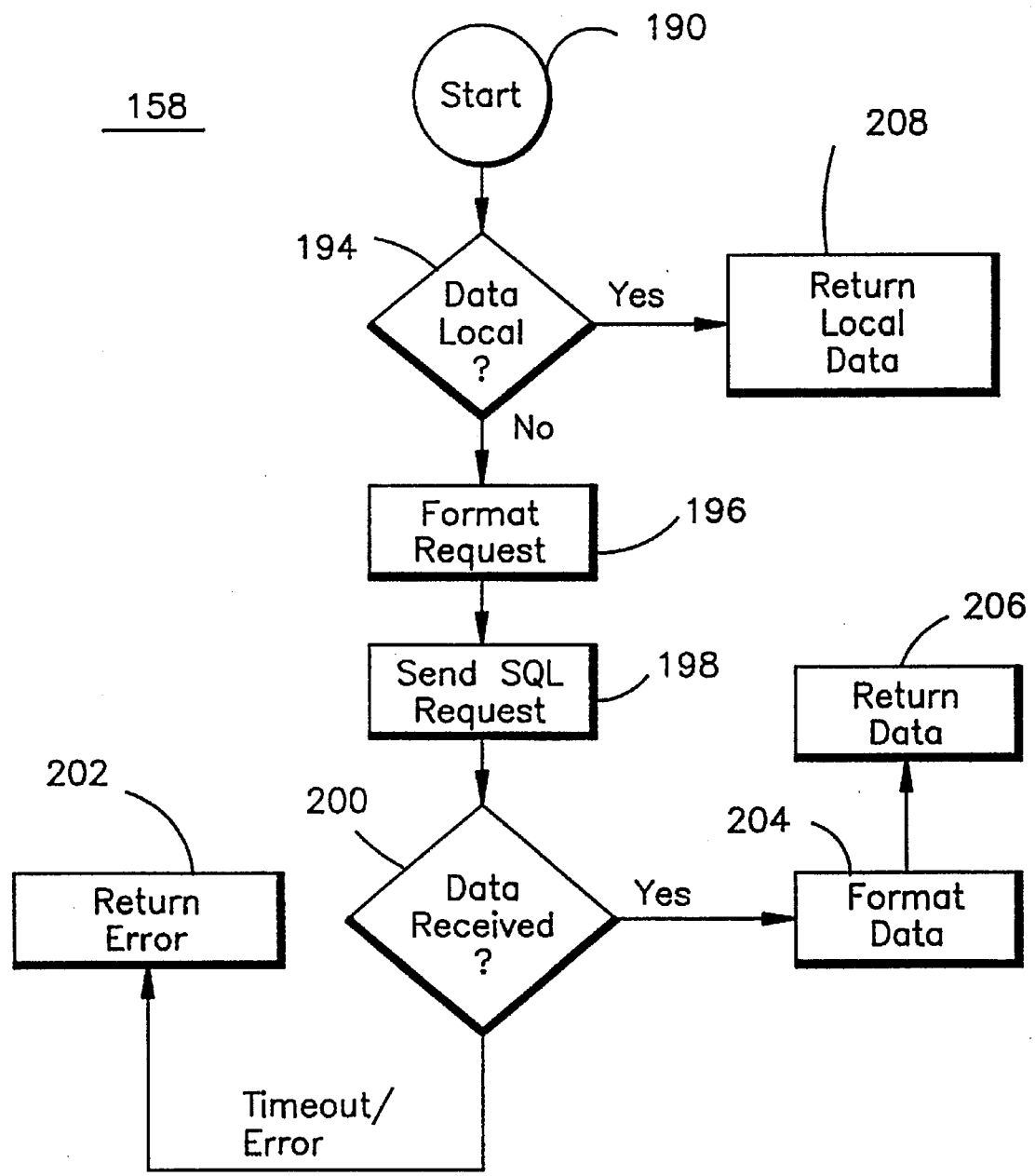
FIG. 6 is a flow diagram of the Transaction Manager program shown in the architecture diagram of FIG. 4.

Referring now to FIG. 6, there is shown the transaction manager program 158 which responds to a call from the application program 154 (see FIG. 4) for data to be processed thereby and provides an application programming interface (API) 157 to the application program which allows it to access the database in the server 130. The transaction manager program 158 also supports the program manager program 156 to access programs stored in the database of the server 130. Thus, it is seen that the program manager program 156 of FIG. 5 accesses remote programs and overlay modules whereas the transaction manager 158 of FIG. 6 accesses any kind of data. Initially, step 194 determines whether the requested data is in the local memory, i.e., SRAM 146, and, if so stored, step 208 returns the local data to be processed by the application program. If not, step 196 formats an SQL request for the requested data and step 198 calls the radio protocol stack program 160 (see FIG. 4) thus actuating the radio module 152 and transmitting the SQL request via the transceiver 114 to access the requested data in the database of the server 130. Step 200 waits while the server 130 accesses the requested data and transmits it via the transceiver 114 to the requesting terminal 112. Step 200 times a response period, e.g., 1 minute, and if that period is exceeded indicating an error condition, step 202 returns an error message to the calling application program. If the data is received within the response period, step 204 formats the requested data in a form usable by the calling application program, before step 206 returns that data to the application program. Step 206 returns the data to the SRAM 146, whereby control is passed to the application program which uses the returned data.

The presentation manager program 216, shown in FIG. 9, processes the SQL request transmitted from one of the terminals 112 (see FIG. 2) via the transceiver 114 and a standard interface, e.g. Unix sockets or IBM NetBIOS, to the database manager program 212 (see FIG. 8). The database manager program 212 interprets the SQL request and accesses the hard disk drive 137 accordingly (see FIG. 7). This allows an application program being executed by the microprocessor 140 (see FIG. 3) to establish sessions with any SQL accessible database as maybe formed within the hard disk drive 137 of the database server 130. The principle function of the presentation manager program 216 is to translate between that format used by the transaction manager program 158 of a terminal 112 and the SQL format of the database of the hard disk drive 137, if these formats are different. The SQL request to be applied to the database management program 212 is semantically configured in accordance with the function to be achieved. The SQL request may direct that data be inserted into the disk drive 137, that data be accessed and retrieved, that a new program or overlay module be retrieved from the disk drive 137, that data be added to one or more fields in a set of records stored in the disk drive 137 or that data be deleted from one or more records of the disk drive 137. Updating involves the transmitting of new variable values from the originating terminal 112.

Referring now to the flow diagram of FIG. 9, the presentation manager program 216 enters through start step 230 to step 232, which waits for a SQL request to be forwarded from the radio protocol stack 220 (see FIG. 8). As will be described below, the SQL request is directed toward the database manager program 212. Step 234 receives the SQL request as a sequence of bytes. Step 236 comes into play only if some reformulation of the SQL request is necessary. In a first instance, if the database manager program 212 was not adapted to support the ANSI standard SQL format or if the SQL request was compressed, then step 236 would be necessary to decompress the data or to translate the format of the SQL request into that of the particular database manager program 212 employed in the system. Next, step 238 provides the data to the database manager program 212 through an interface in the illustrative form of the IBM NetBIOS interface. The translation step 236 is identical to the formatting request 196 of the transaction manager program 158 of FIG. 6 and, ordinarily, it would be only necessary to perform the formatting or translation step once upon a particular SQL request, preferably in the presentation manager program 216. Step 240 waits for the database manager program 212 to access the disk drive 137 for a predetermined time period. If the requested material, i.e., the application specific data, root overlay or memory overlay, is received within the time period, it is translated in step 242 to the format of the requesting terminal 112, before calling in step 244 the radio protocol stack program 220 to transmit the accessed material back to the requesting terminal 112.

On the other hand, if the SQL request is one to add or delete data from the hard disk drive 137, step 240 generates a status message indicating that the change of the hard disk drive 137 has been completed, before step 242 translates that status message into the terminal format and the radio protocol stack 220 is called in step 244 to send that message back to the requesting terminal 112. If the time period set in step 240 times out, without receiving the requested material, step 246 transmits an error packet to the radio protocol stack program 220, whereby an error message is returned to the requesting terminal 112.

Thus, there has been described a data capture system 110 that distributes the application program between the memory of a terminal 112 and a database server 130 serving a plurality of such terminals 112. In this fashion, the complexity of the program to be executed upon a terminal 112 is minimized by permitting the data base server 130 and its hard disk 137 to store a large variety of application programs to be served to its client terminals 112. The above data capture system 110 permits dynamic loading of the original programs or root modules and subsequent memory overlays from the hard disk 137, whereby the size of the SRAM 146 of a terminal 112 and the power required by the terminal 112 is minimized. Further, the amount of data transmitted via the RF link between each of the plurality of terminals 112 and the database server 130 is minimized. Further, the database server 130 provides a "user friendly" environment for the development of application programs for the terminals 112. In particular, the database server 130 is capable of readily developing both the client and server portions of the application programs to be executed by the terminal's microprocessor 140.

Figure 10:
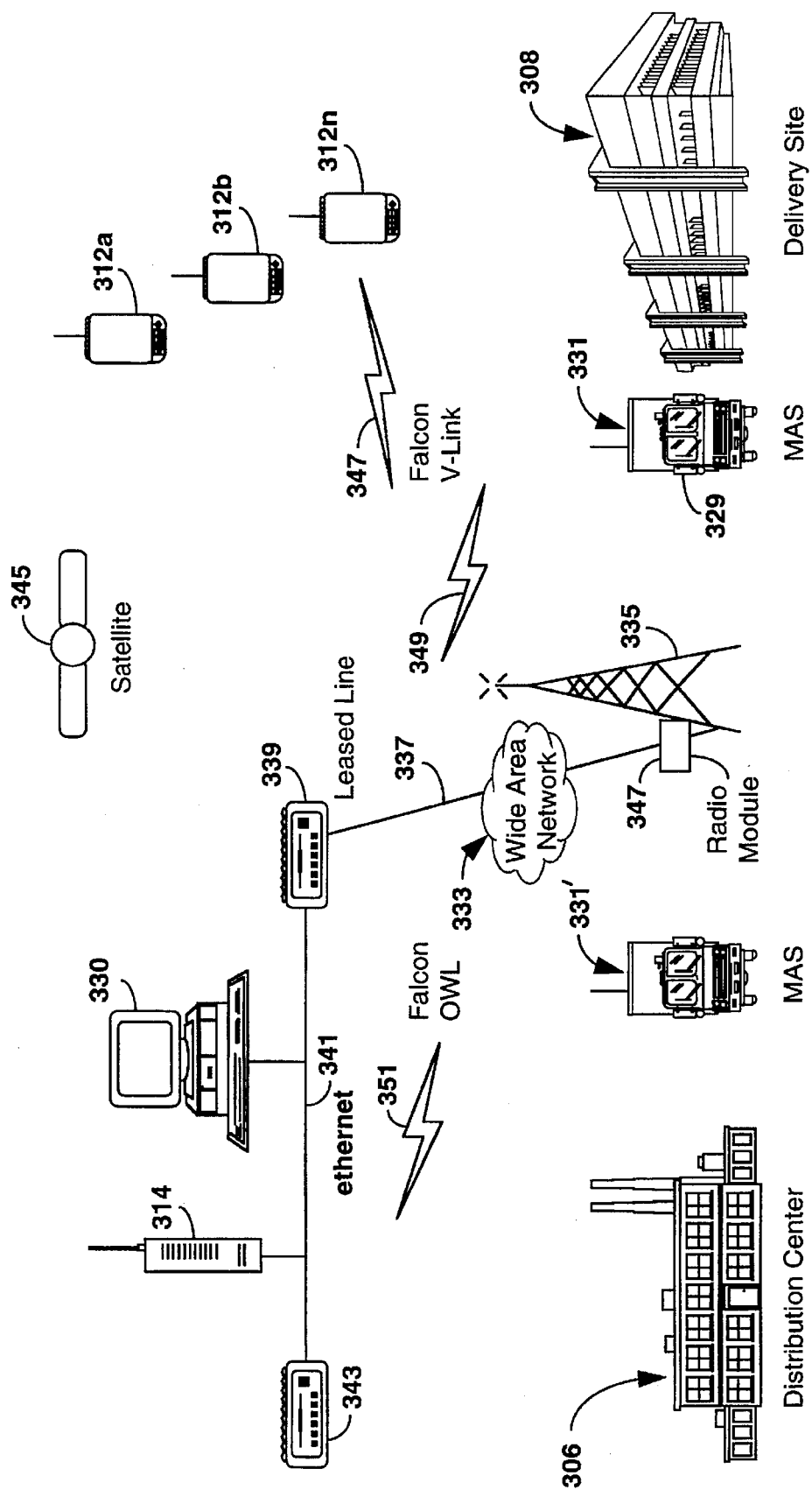
FIG. 10 is a diagrammatic illustration of an expanded data capture system configured in a manner similar to that of FIG. 2 in a client/server architecture to effect distributed processing between a plurality of portable date collection terminals employing computers for executing programs and a mass storage for storing application programs and/or data to be selectively transmitted under the control of a data base server for use by the computer of a designated terminal, but further including a wide area network to which the mass storage is connected and a mobile access server (MAS) for controlling in response to a call from a determined one of the terminals the flow of application programs and/or data from the mass storage to the determined terminal.

Referring now to FIG. 10, there is shown a further, alternative embodiment of this invention in the form of a data capture system 310 where elements similar to those shown in FIGS. 2-9 are identified by like numerals but in the 300 series. In particular, the data capture system 310 comprises a plurality of portable data collection terminals 312a, b - - - n, a vehicle 329 for transporting a mobile access server (MAS) 331 as will be described in detail below with respect of FIG. 11, a mass storage as incorporated into an application server 330 and a wide area network 333 to which the application server 330 is connected.

Generally the purpose of the data capture system 310 is similar to that of the system 110. In particular, the system 310 conveys data from the data collection terminals 312 as deployed at a remote location in the illustrative form of a warehouse or delivery site 308, to a main information or control center 306. In return, the system 310 responds to a call from a determined data collection terminal 312 to convey selected portions of a new application program, an application overlay and/or application specific data to the determined, calling terminal 312 for use by a computer incorporated within each of the terminals 312.

The wide area network 333 is illustratively coupled via a bidirectional data/program transmission path, e.g., a leased telephone line 337, to a gateway 339, which in turn is connected to a second bidirectional data/program transmission path in the illustrative form of an ethernet 341. The wide area network is also connected to a long range radio module 347, which in turn is connected to an antenna 335. It is appreciated that any number of antennae 335 and related modules 347 may be also connected to the network, and/or that the wide area network 333 may permit transmission over great distances from each of the antennae to the main information center 306. The gateway 339 interconnects the transmissions lines 337 and 341. As shown in FIG. 10, the ethernet 341 is coupled to the application server 330 which incorporates the mass storage, a transceiver 314 and a terminal or remote server 343. The remote server 343 permits access to the application server via a suitable dial up link such as conventional telephone lines. The gateway 339 controls or directs the flow of data and/or programs between the leased line 337 and selected of the devices 330, 314 and 343 as may be connected to the ethernet 341. In particular, the gateway 339 functions to address the information flow from the line 337 to selected of the connected devices 330, 314 and 343.

A first wireless communication capability as identified by the numeral 347 exists between the MAS 331 and each of the plurality of data collection terminals 312a, b - - - n. A second wireless communication capability as identified by the numeral 349 is established between the MAS 331 and the wide area network 335 and, in particular, the antenna 335 connected to one end of the network 335. It is significant that the MAS 331 be mobile to permit it to move, e.g., to be transported by the vehicle 329, to any number of sites. For example, the data collection system 310 in contrast to the system 110 is adapted to collect data at a plurality of sites and from distinct pluralities of terminals 312 as are located at corresponding sites. Such operation contemplates that the vehicle 329 is capable of transporting its MAS 331 from site to site, whereat the MAS 331 will facilitate the transmission of the collected data from the corresponding set or plurality of data collection terminals 312 to the wide area network 335. Alternatively, the vehicle 329 may be equipped with docks (not shown) which are coupled by hardwired links to the MAS 331. Such an arrangement would permit the data collection terminals 312 to be brought to the vehicle 329 and loaded into a dock before the collected would be downloaded over the hardwired link to the MAS 331.

As illustrated in FIG. 10, the MAS 331 may move from that position adjacent to the delivery site 308 to another position adjacent the main information center 306; in this latter position, a third wireless communication capability identified by the numeral 351 is available to transmit the information flow directly between the MAS 331 and the ethernet 341, without the need for using the leased line 337. As will be described in detail below, each of the wireless communication capabilities 347, 349 and 351 respectively include a single transceiver coupled with and operated under the control of the MAS 331 and a transceiver included within each of the data collection terminals 312a, b - - - n, a transceiver (not shown) as connected with the antenna 335 and the transceiver 314, respectively. It is appreciated that the cost of using such capabilities 349 as compared to the data packet costs of transmission over the leased line 337, is relatively low. As will be explained later, such cost factors influence significantly where the computer application and application specific data are stored; in particular, such cost considerations will dictate that most of and the most popular computer applications and application specific data as used by the calling terminal 312 are stored as will be described below with respect to FIG. 11 in that memory incorporated in the MAS 331 as opposed to being stored in the mass memory associated with the application server 330.

Appreciating that the diagrammatic illustration of FIG. 10 is not drawn to scale, the wireless communication capabilities 347, 349 and 351 are designed to transmit the collected data, the program applications and the application specific data over varying distances. For example, the wireless communication capabilities 347 and 351 would be designed in terms of power and data rate to transmit over relatively short distances, appreciating that the vehicle 329 would be capable of approaching within 500–1,000 feet of either of the delivery site 308 and the plurality of data collection terminals 312 disposed therein, and the transceiver 314 disposed at the main information center 306. The wireless communication capability 349 differs from the capabilities 347 and 351 in that it is designed in terms of its power rating and data transmission speed to transmit the information flow over substantially greater distances; such a characteristic permits the MAS 331 to be transported to different delivery sites 308 at significant distances, e.g., 5–30 miles, from the antenna 335 and its radio module 347. As illustrated in FIG. 10, the transmission distance between the center 306 and the MAS 331 may be significantly increased by using utilizing transmission via a satellite 345 from the MAS 331 to the transceiver associated with the antenna 335. System of satellites disposed in geosynchronous orbits are capable of bidirectionally transmitting data between a MAS 331 disposed anywhere in the USA or anywhere in the world, and the main information center 306. As will be described below with respect to FIG. 11, the MAS 331 employs at least two different transceivers or radio modules of different power and data rate specification to permit the transmission of the information flow over these different ranges.

Figure 11:
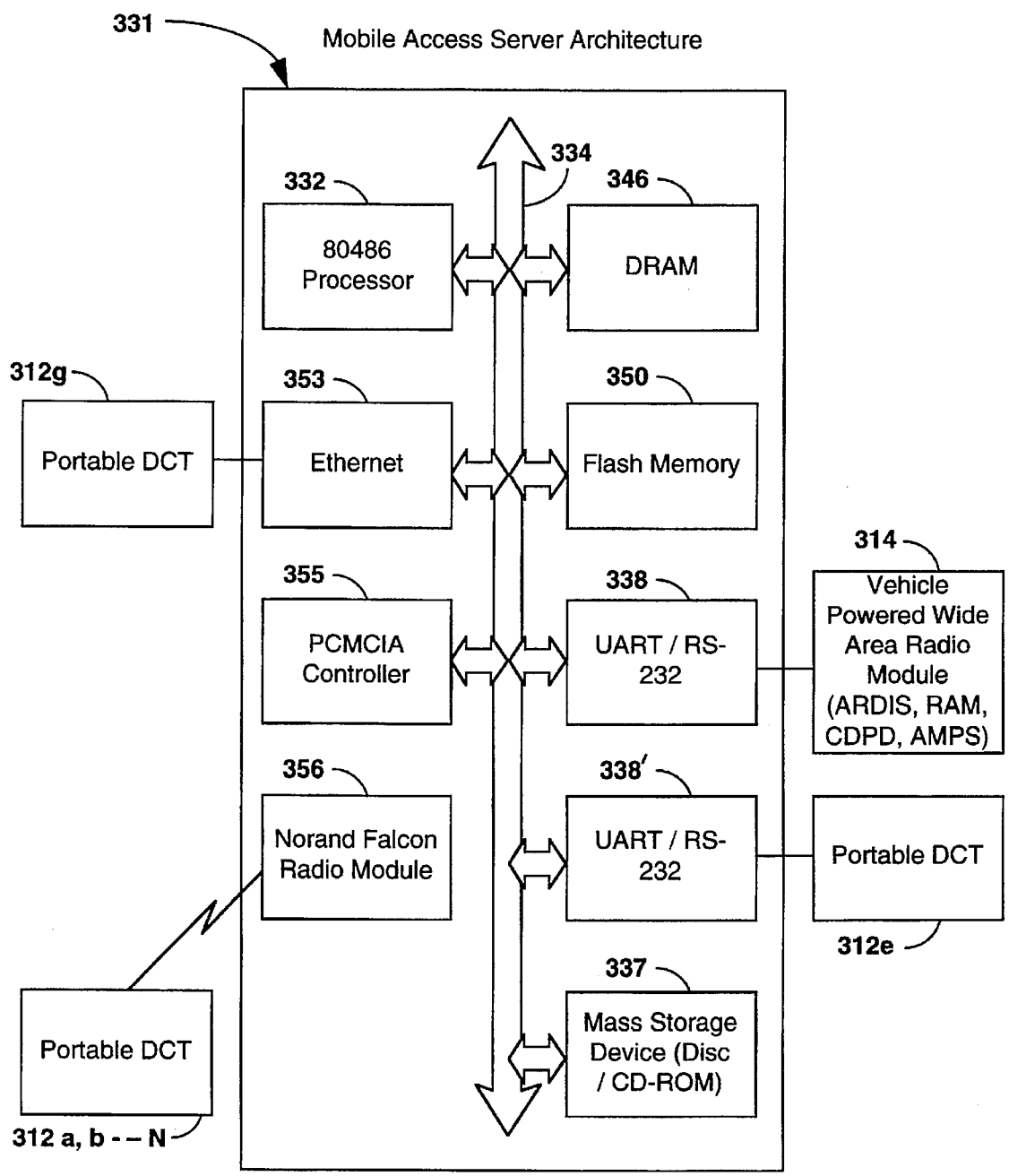
FIG. 11 is a functional block diagram illustrating the architecture of the mobile access server as shown in FIG. 10.
Figure 12:
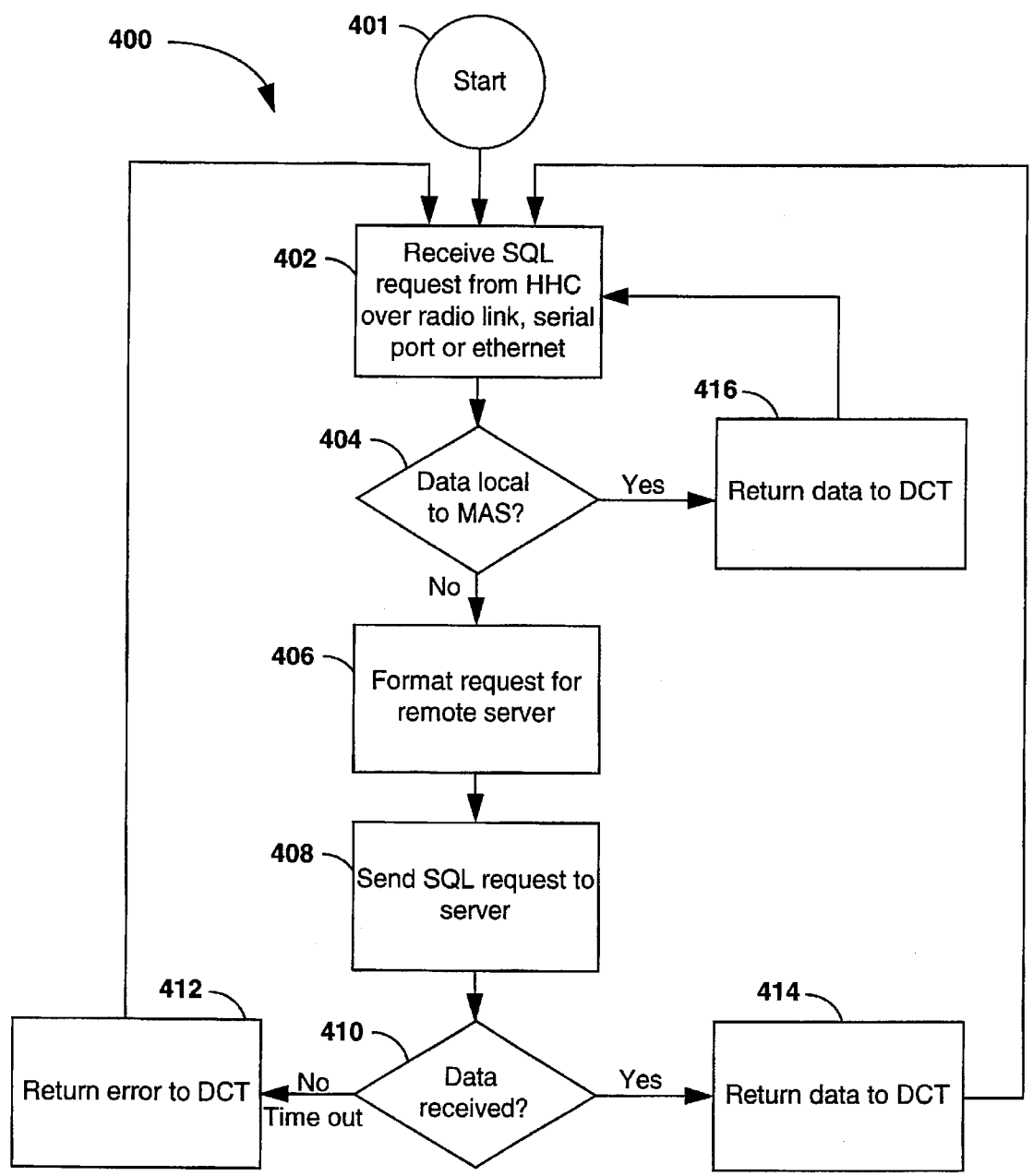
FIG. 12 is a flow diagram of the program executed by a computer included within the mobile access server as shown in FIG. 11.

Referring now to the functional block diagram of FIG. 11, there is shown the hardware architecture of the MAS 331, including a data bus 334 for connecting the various elements thereof, a mirocprocessor 332 illustratively taking the form of that processor manufactured by Intel under its model number 80486, a dynamic random access memory (DRAM) 346, a flash ROM 350 and the mass storage device 337 which may illustratively take the form of Disc/CD-ROM for storing the new application programs, application overlays and application specific data. The DRAM 346 is adapted to store the programs controlling the operations of the MAS 331, for example the program as shown in FIG. 12, and any data used by such programs. The flash ROM 350 is adapted to store the BIOS programs required for the operation of the processor 332. As indicated above, the MAS 331 includes at least two different types of transceivers or radio modules adapted to transmit the bidirectional data flow over distinct ranges of distance. The first transceiver, the wide area radio module 314, and the radio module 347 are a part of the wireless communication capacity 349 for transmitting the bidirectional information flow between the MAS 331 and the wide area network 333. A serial communication interface (UART) 338 interconnects the wide area radio module to the data bus 334. The second transceiver, i.e., the radio module 356, is a part of the wireless communication capacity 347 for transmitting the bidirectional information flow between the MAS 331 and each of the plurality of data collection terminals 312. A PCMCIA controller 355 interconnects the radio module 356 to the data bus 334. FIG. 11 further illustrates that at least two other data collection terminals 312e and 312g are connected directly to the data bus 334 by a UART 338' and the ethernet 353. The high speed data transmission characteristics of the ethernet 353 as compared to those of serial communication interface 338' make it a preferable data link between the MAS 331 and a dock (not shown) for receiving a plurality of the data collection terminals 312. The dock would be permanently mounted on the vehicle 329 thereby permitting the terminals to be securely transported by the vehicle 329, and further to permit downloading of the collected data from the terminals 312 loaded in the dock for transmission to the wide area network 335.

The flow diagram of FIG. 12 illustrates the operation of the MAS 331 as carried out by the processor 332 executing the corresponding control program. In a start step 401, the MAS 331 waits until a call is received from one of the plurality of data collection terminals 312a, b - - - n. As described above, each call is formatted in the SQL language and further identifies which of the terminals 312 from which it was transmitted. The SQL call further identifies the information needed to continue the further operation of the identified terminal 312, e.g., a new application program, an overlay and/or application specific data. In this regard, the structure and operation of the terminals 312 in the embodiment of FIGS. 10–14 corresponds respectively to the hardware architecture of FIG. 3, the memory architecture of FIG. 4 (flash ROM 150), and the program manager program 156 illustrated in FIG. 5 for formulating the SQL call for the next overlay or a new application program and the transaction manager program 158 illustrated in FIG. 6 for formulating the SQL call for application specific data.

When a call is received from an identified data collection terminal 312, step 402 saves in the DRAM 346 the ID of the calling data collection terminal 312, as well an indication of which communication path was used to transmit the received SQL call to the MAS 331. As shown in FIG. 11, the SQL call may be transmitted to the MAS 331 variously by the radio module 356, or directly from the terminal 312e via the serial communication interface 338' or from the terminal 312g via the ethernet 353. The stored communication path indication identifies from where the calling terminal 312 is calling and facilitates the transmission of the requested information back to the calling terminal 312.

Next in step 404, it is determined whether the called new program, application overlay or application specific data is locally stored in the MAS 331, i.e., whether the requested information is stored in the mass storage 337. If locally stored, step 416 transmits the requested information back to the calling terminal 312. As will be described below with respect to FIG. 13, step 416 determines where the calling terminal 312 is presently located and selectively actuates one of the radio module 356, ethernet 353 or the serial communication interface 338 to transmit the requested information back to the portable calling terminal 312 at its present location. In the process implemented by steps 401, 402, 404 and 416, the MAS 331 functions as a server to the data collection terminals 312, in a manner similar to the server relationship of the data base server 130 to the plurality of date collection terminals 112a, b - - - n.

If the requested information is not locally stored in the MAS 331, step 406 formats a request or SQL call, before step 408 transmits the formulated SQL call from the MAS 331 via the wireless communication capability 349 to the wide area network 335 and, in particular, to the remote or application server 330 which is connected to the wide area network 335 and its ethernet 341 as shown in FIG. 10. In particular, step 408 selectively actuates one of the long range radio module 314 or the short range radio module 356, before transmitting the SQL request to the application server 330 via the actuated radio module. The contemplated radio module selection could be carried out in different ways. The vehicle operator as he or she is approaching the main information center 306, may enter that indication via a suitable keyed data input device (not shown). Alternatively, the transceiver 314 disposed at the main information center 306 could continuously transmit a message coded to indicate that it is transmitted from the transceiver 314. When the short range radio module 356 begins to receive positively the message of the transceiver 314, the MAS 331 sets a flag indicating that further communications may be now made via the short range radio 356 to the transceiver 314. It is contemplated that in one illustrative embodiment that steps 406 and 408 would perform functions similar to those carried out by the program manager program 156, the transaction manager program 158 and the radio protocol stack 160 as variously shown in FIGS. 4, 5 and 6. The process implemented by the steps 406 and 408 functions as a client to the application server 318 in a fashion similar to the client relationship between the plurality of data collection terminal 112a, b - - - n and the data base server 130 as shown in FIG. 2.

Step 410 initiates upon the transmission of the SQL call to the application server 318 the timing of a period in which to receive back from the server 318 the requested new application, application overlay and/or application specific data. The application server 330 in one illustrative embodiment thereof operates in a manner similar to the database server 130, whose hardware structure, the memory architecture and programming are illustrated respectively in FIGS. 7, 8 and 9. If the requested information is timely received before the period times out, step 414 selectively actuates (in a manner similar to that of step 416 and as will be explained below with respect to FIG.13) one of the long range module 314 and short range module 356 to transmit the requested information to the calling data collection terminal 312. Upon receipt, the calling terminal 312 will continue to operate, using the received information. If the period times out without receiving the requested information, step 412 selectively actuates one of the modules 314 or 356 to transmit an error message back to the calling data collection terminal 312 to inform it that the requested information is at least not currently available. The response of the calling terminal 312 depends on the nature of application currently being run by the calling terminal 312. For example if a particular application can not continue to operate without the requested information, the calling terminal 312 will place calls for that information until it is received. On the other hand if the application can continue to operate without that information, the calling terminal 312 will place a limited number of calls and, if the requested information is not received in response to those calls, then the calling terminal 312 will perform another function or use default information.

Figure 13:
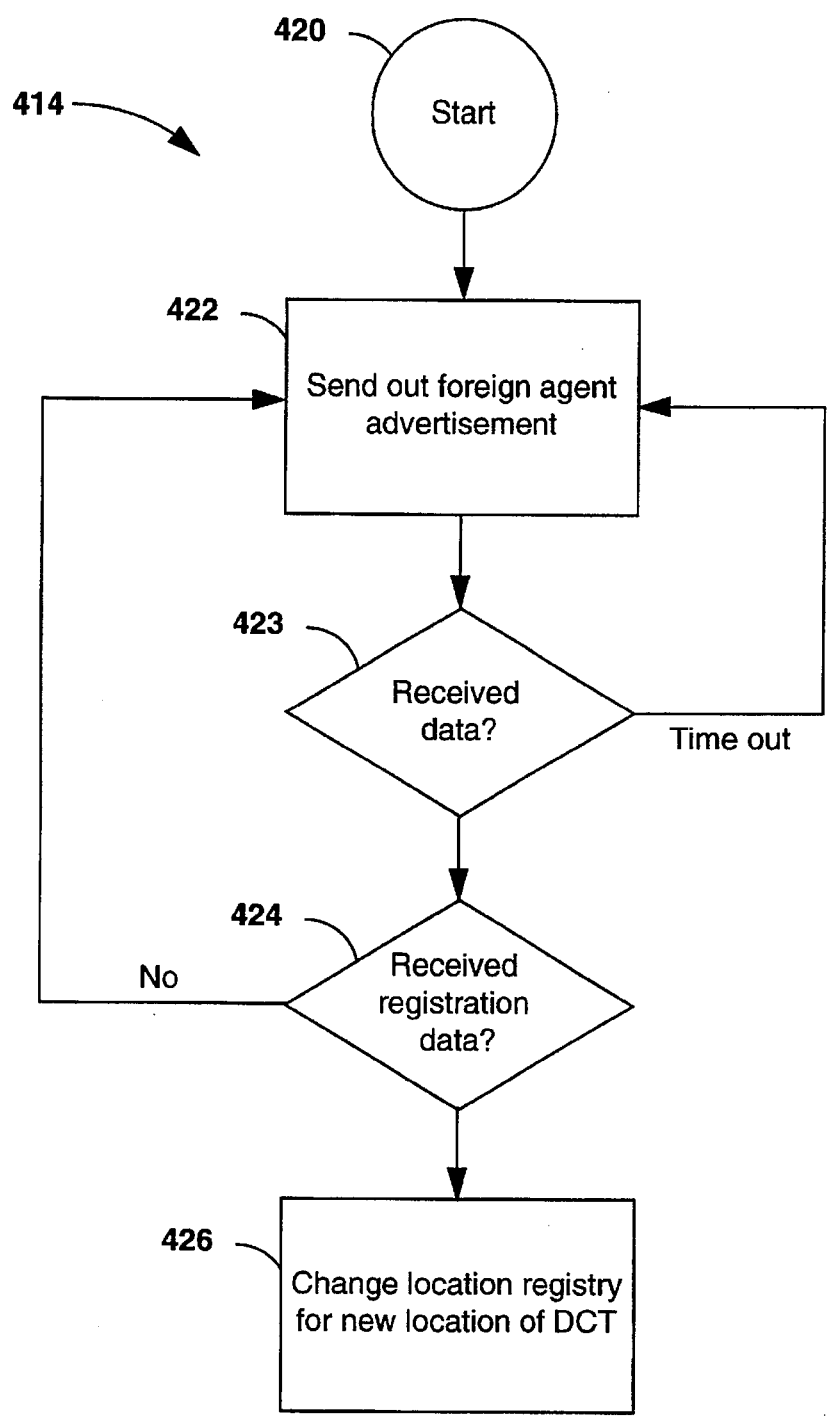
FIG. 13 is a flow diagram of a subroutine incorporated within the program of FIG. 12 for keeping track of the present location of those determined portable terminals within the system of FIG. 10 which place a call for a further application program or part thereof, and/or data.

In FIG. 13, a subroutine is provided to further explain the operation of step 414 or 416. The problem solved by the illustrated subroutine is to identify where the calling data collection terminal 312 is presently located and, correspondingly, which link or port serves to presently connect that calling terminal 312 to the MAS 331, i.e., the ethernet 353, the serial communications interface 338' or the radio module 356. After initiation in a start step 420, the MAS 331 in step 422 repetitively, e.g., every 2 seconds sends out on all 3 ports a "foreign agent advertisement", i.e., a message that the MAS 331 is presently available as a server to receive its call and to respond by returning the requested information. In step 423, the MAS 331 initiates the timing of a period in which a call over any of the three ports of the MAS 331 should be received and listens for a message from a terminal 312 over all of the ports or channels. The processor within the data collecting terminal 312 is programmed to transmit a registration message, which indicates that the transmitting terminal 312 is responding to a received available message as was generated earlier by the MAS 331 in step 422; the terminal's processor is also programmed to generate an advertisement solicitation or request to generate the "foreign agent advertisement" or available message. If that period set in step 423 times out without receiving any message, a return is made to step 422 prompting a further "advertisement" to be transmitted. Next step 424 examines the received message and, if the received signal is a registration message, then step 426 will update the indication stored within the DRAM 346 as to which port has been enabled to transmit information from the MAS 331 to the calling terminal 312. On the other hand if the received message is an advertisement request or solicitation, the subroutine will return to step 422 to again transmit a "foreign agent advertisement." Thus when the MAS 331 has received data from the application server 318 as determined in step 410, the MAS 331 knows the current port by which to transmit the called information to the calling terminal 312, even if the link may have changed between the time when the terminal originally transmitted its call for information to the MAS 331 and the time that collected information is transmitted back to the calling terminal 312. The changing of the link may oft occur when the size of the requested data and, consequently, the transmission times from the MAS 331 to the calling terminal 312 are large. Noting that typical transmission times for a single packet of data, i.e., 500 bytes, is in the order of 5 seconds, the transmission time of an overlay of 35K bytes would require five minutes and a new application of 0.5 Megabytes would be approximately 1½ hours.

It will be apparent that many modifications and variations may be effected without departing from the scope of the teachings and concepts of the present disclosure.

We claim:

1. A system for collecting data from at least one remote site and transmitting the collected data to a main information center and having information distributed throughout said data collecting system, the information comprising first, second and third portions and including a plurality of application programs, data specific to the plurality of application programs, each of the application programs being partitioned into a root module and at least one overlay module, said data collecting system comprising:

a) a plurality of portable terminals for collecting data at the remote site, each terminal comprising means for collecting data, a first memory for storing the first information portion, a keyboard, a computer processor for executing a selected one of the plurality of application programs, means responsive during the execution of the selected one application program by said computer processor to a request for the data specific to the selected one application or for the next overlay or to a request entered by the user upon said keyboard for a root module of a new application program for generating an information call for that requested information, first radio means, and first memory searching means responsive to the information call for searching said first memory for that requested information and if the requested information is not found therein for transmitting the information call;

b) a first mobile server to be transported to various locations with respect to the main information center and the remote site and comprising a second memory for storing the second information portion, second radio means for receiving from said first radio means the transmitted information call, third radio means and second memory searching means responsive to the received information call for searching said second memory for that requested information, said second searching means responsive to absence of that requested information for actuating said third radio means to retransmit the information call and responsive to the presence of that requested information for accessing from said second memory that requested information and actuating said second radio means to transmit to said first radio means the accessed requested information; and c) a second server disposed at the main information center and comprising a third memory for storing the third information portion, fourth radio means for receiving from said third radio means the retransmitted information call and third memory searching means responsive to the received, retransmitted information call for searching said third memory means for that requested information, said third memory searching means responsive to the absence of that requested information for generating a message indicating an absence of that requested information within said data collecting system and actuating said fourth radio means to transmit the information absence message, said third memory searching means responsive to the presence of that requested information within said third memory for accessing third memory means and actuating said fourth radio means to transmit to said third radio means the accessed, requested information.

2. A system for collecting data from at least one remote site and transmitting the collected data to a main information center and having information distributed throughout said data collecting system, the information comprising first, second and third portions, said data collection system comprising:

a) at least one portable terminal for collecting data at the remote site, said portable terminal comprising means for collecting data, a first memory for storing the first information portion, information requesting means responsive to the need for information for use by its terminal to generate an information call identifying the needed information, and first memory searching means responsive to the information call for searching said first memory for the presence or absence of that needed information, said first memory searching means responsive to the presence of that needed information for accessing said first memory and supplying that accessed, needed information for use by said portable terminal;

b) a first mobile server to be transported to various locations with respect to the main information center and the remote cite, and comprising a second memory for storing the second information portion, and second memory searching means responsive to the information call for searching said second memory for presence or absence of that needed information;

c) a second server at the main information center, and comprising a third memory for storing the third information portion, and third memory searching means for searching said third memory for the presence or absence of that needed information;

d) first communication means for interconnecting said first mobile server and said data collection terminal for transmitting the collected data from said data collection terminal to said first mobile server, said first memory searching means responsive to the absence of that needed information within said first memory for transmitting from said calling terminal the information call via said first communication means to said first mobile server, said second memory searching means responsive to the receipt of the transmitted information call for searching said second memory for presence therein of the needed information and, if present, for accessing the needed information from said second memory and for transmitting the accessed, needed information via said first communication means for use by said calling terminal; and e) second communication means for interconnecting said first mobile server and said second server for transmitting the collected data from said first mobile server to said second server, said second memory searching means responsive to the receipt of the transmitted information call from said calling terminal for searching said second memory for that needed information, and if absent, for retransmitting the information call via said second communication means from said first mobile server to said second server, said third memory searching means responsive to the of the receipt of the retransmitted information call from said first mobile server for searching said third memory for that needed information and, if present, for accessing said third memory and transmitting the accessed, needed information via said first and second communication means for use by said calling terminal.

3. The data collecting system as claimed in claim 2, wherein said first communication means comprises a hard wired conductive path interconnecting said data collecting terminal and said first mobile server.

4. The data collecting system as claimed in claim 3, wherein said first communication means further comprises a serial communications interface.

5. The data collecting system as claimed in claim 3, wherein said first communication means comprises an ethernet.

6. The data collecting system as claimed in claim 3, wherein said second communication means comprises is wireless.

7. The data collecting system as claimed in claim 2, wherein said first and second communication means are wireless.

8. The data collecting system as claimed in claim 7, wherein said data collecting terminal comprises a first radio having a first transmission range, said first mobile server having a second radio of said first transmission range and a third radio of a second transmission range, said second server having a fourth radio of said second transmission range, said second transmission range being longer than said first range, said first communication means comprising said first and second radios.

9. The data collecting system as claimed in claim 8, wherein said second server has a fifth radio of said first transmission range, said second communication means operating alternatively in a first short range mode wherein said second communication means comprises said first radio and said fifth radio when said first mobile server is transported to a location within said first transmission range from the main information center or in second long range mode wherein said second communication means comprises said third and fourth radios when said first mobile server is transported to a location beyond said first range.

10. The data collecting system as claimed in claim 2, wherein said first mobile server comprises at least first and second ports, said first communication means is coupled to both of said first and second ports.

11. The data collecting system as claimed in claim 10, wherein said first communication means comprise a first radio and a hard wired path, said first radio being connected to said first port and said hard wired path being connected to said second port.

12. The data collecting system as claimed in claim 10, wherein said second memory searching means senses which one of said first and second ports through which the transmitted information call is received for transmitting the accessed, needed information to said data collecting terminal through said sensed one of said first and second ports.

13. The data collecting system as claimed in claim 10, wherein said first mobile server further comprises port monitoring means for periodically transmitting through each of said first and second ports a message that said first mobile server is available to receive and to respond to the transmitted information call, said first communication means connecting said data collecting terminal to one of said first and second ports, said data collecting terminal responsive to said available message for transmitting via said connected one port a response message, said port monitoring means sensing which connected one port received the most recent response message from said data collecting terminal for transmitting back to said data collecting terminal that needed information over said sensed one connected port, regardless of whether said data collecting terminal has been recently been reconnected to a different one of said first and second ports.

14. The data collecting system as claimed in claim 2, wherein there is included a plurality of said data collecting terminals.

15. The data collecting system as claimed in claim 2, wherein there is further included a wide area network, said first mobile server comprising a first radio, said second server comprising a second radio, said second communication means comprising said first and second radios, said wide area network comprising a telephone line interconnecting said second radio and said second server.

16. The data collecting system as claimed in claim 15, wherein there is further included a third radio and a direct hard wired data path interconnecting said second server and said third radio.

17. The data collecting system as claimed in claim 16, wherein said first mobile server comprises a fourth radio, said first and second radios having a first transmission range, said third and fourth radios having a second transmission range, said first transmission range being greater than said second range.

18. The data collecting system as claimed in claim 17, wherein said second communication means further comprises said third and fourth radios, said second communication means operating alternatively in a first short range mode wherein said third and fourth radios are actuated to establish bidirectional, wireless transmission between said first mobile server and said second server when said first mobile server is transported to a location within said first short transmission range from the main information center or in a second long range mode wherein said first and second radios are actuated to establish bidirectional, wireless transmission between said first mobile server and said second server when said first mobile server is transported to a location outside said first short transmission range from the main information center.

19. In a distributed system for processing information at least at a remote site and a main information center, the information comprising at least first, second and third portions, the first portion being stored at the remote site, the third portion being stored at the main information center, an information call is generated at the remote site if the information needed at the remote site is not found within the first information portion, a dual operating server/client unit, said server/client unit being mobile with respect to the remote site and the main information center and comprising:

a) first communication means for interconnecting the remote site and said server/client unit to transmit the information call from the remote site to said server/client unit;

b) second communication means for interconnecting the main information center and said server/client unit;

c) memory means for storing the second portion;

d) client means coupled to said first and second communication means and responsive to the information call transmitted thereto via said first communication means for searching said memory means for the absence of the needed information therein and, if absent, for retransmitting the information call via said second communication means to the main information center; and e) server means coupled to said first communication means and responsive to the information call transmitted thereby for searching said memory means for the presence of the needed information and, if present, for transmitting the needed information via said first communication means to the remote site.

20. The server/client unit as claimed in claim 19, wherein said first communication means comprises a hard wired conductive path interconnecting the remote site and said server/client unit.

21. The server/client unit as claimed in claim 20, wherein said first communication means further comprises a serial communications interface.

22. The sever/client unit as claimed in claim 20, wherein said first communication means comprises an ethernet.

23. The server/client unit as claimed in claim 20, wherein said second communication means is wireless.

24. The server/client unit as claimed in claim 19, wherein said first and second communication means are wireless.

25. The client/server unit as claimed in claim 19, wherein said client/server unit comprises at least first and second ports, said first communication means is coupled to both of said first and second ports.

26. The client/server unit as claimed in claim 25, wherein said first communication means comprise a first radio and a hard wired path, said first radio being connected to said first port and said hard wired path being connected to said second port.

27. The client/server unit as claimed in claim 25, wherein said server means senses which one of said first and second ports through which the transmitted information call is received for transmitting the accessed, needed information to the remote site through said sensed one of said first and second ports.

28. The server/client unit as claimed in claim 19, wherein said second communication means comprises a first radio having a first transmission range, and a second radio having a second transmission range, said first transmission range being greater than said second range, said second communication means operating alternatively in a first short range mode wherein said second radio is actuated to establish bidirectional, wireless transmission between said sever/client unit and the main information center when said client/server unit is transported to a location within said second short transmission range from the main information center or in a second long range mode wherein said first radio is actuated to establish bidirectional, wireless transmission between said client/server unit and the main information center when said client/server unit is transported to a location outside said first short transmission range from the main information center.

* * * * *